US009144055B2

(12) United States Patent
Sun et al.

(10) Patent No.: US 9,144,055 B2
(45) Date of Patent: Sep. 22, 2015

(54) METHOD AND APPARATUS FOR ASYNCHROSOUS POSITIONING OF WIRELESS BASE STATIONS

(71) Applicant: QUALCOMM Incorporated, San Diego, CA (US)

(72) Inventors: Ming Sun, San Diego, CA (US); Benjamin A. Werner, San Carlos, CA (US); Weihua Gao, San Jose, CA (US); Sai Pradeep Venkatraman, Santa Clara, CA (US)

(73) Assignee: Qualcomm Incorporated, San Diego, CA (US)

( * ) Notice: Subject to any disclaimer, the term of this patent is extended or adjusted under 35 U.S.C. 154(b) by 160 days.

(21) Appl. No.: 14/054,132

(22) Filed: Oct. 15, 2013

(65) Prior Publication Data

US 2015/0105097 A1    Apr. 16, 2015

(51) Int. Cl.
*H04W 24/00*  (2009.01)
*H04W 64/00*  (2009.01)
(Continued)

(52) U.S. Cl.
CPC .......... *H04W 64/003* (2013.01); *G01S 5/0226* (2013.01); *G01S 5/0242* (2013.01); *G01S 5/06* (2013.01); *H04W 64/006* (2013.01)

(58) Field of Classification Search
CPC ....... G01S 5/0226; G01S 5/0242; G01S 5/06; H04W 64/003; H04W 64/006
USPC ........... 455/404.2, 418–419, 456.1–457, 502, 455/561, 550.1, 420, 421, 422.1; 370/328, 370/338, 324, 350, 503, 509–512, 395.51, 370/395.53
See application file for complete search history.

(56) References Cited

U.S. PATENT DOCUMENTS

| 6,185,429 | B1 * | 2/2001 | Gehrke et al. ................. 455/502 |
| 7,412,248 | B2 | 8/2008 | McNew et al. |
| 7,990,314 | B2 * | 8/2011 | Liao ......................... 342/357.29 |

(Continued)

FOREIGN PATENT DOCUMENTS

| WO | WO-9937109 A2 | 7/1999 |
| WO | WO-0223215 A1 | 3/2002 |

OTHER PUBLICATIONS

International Search Report and Written Opinion—PCT/US2014/060349—ISA/EPO—Dec. 15, 2014.

*Primary Examiner* — Babar Sarwar
(74) *Attorney, Agent, or Firm* — Kilpatrick Townsend & Stockton LLP

(57) ABSTRACT

Various arrangements for determining a location of a base station without timing synchronization are presented. A mobile device may determine that it is moving faster than a threshold velocity. The mobile device may capture a first unsynchronized time of arrival (TOA) measurement and determine an associated first location, wherein the first unsynchronized TOA measurement is based on a first unsynchronized timing measurement of a first received reference signal. The mobile device may capture a second unsynchronized TOA measurement and determine an associated second location, wherein the second unsynchronized TOA measurement is based on a second unsynchronized timing measurement of a second received reference signal. Based on the mobile device moving faster than the threshold velocity, the first location, the second location, the first unsynchronized TOA measurement, and the second unsynchronized TOA measurement may be used for determining the location of the base station.

30 Claims, 8 Drawing Sheets

(51) Int. Cl.
*G01S 5/02* (2010.01)
*G01S 5/06* (2006.01)

(56) References Cited

U.S. PATENT DOCUMENTS

| | | |
|---|---|---|
| 8,112,096 B2 | 2/2012 | Mazlum et al. |
| 8,219,116 B1 | 7/2012 | Ji et al. |
| 2001/0006515 A1* | 7/2001 | Lee et al. ............ 370/331 |
| 2002/0163466 A1* | 11/2002 | Jin ............... 342/356 |
| 2006/0009235 A1 | 1/2006 | Sheynblat et al. |
| 2007/0252761 A1* | 11/2007 | Koorapaty et al. ........ 342/464 |
| 2008/0161014 A1* | 7/2008 | Monnerat ............ 455/456.1 |
| 2008/0278373 A1* | 11/2008 | Monnerat ............ 342/357.09 |
| 2010/0238917 A1* | 9/2010 | Silverman et al. ........ 370/350 |
| 2010/0331012 A1* | 12/2010 | Zhang ............ 455/456.2 |
| 2012/0306692 A1 | 12/2012 | Werner |
| 2013/0235864 A1* | 9/2013 | Do et al. ............ 370/350 |
| 2014/0225780 A1* | 8/2014 | Liu ............... 342/465 |
| 2014/0266907 A1* | 9/2014 | Taylor et al. ............ 342/387 |
| 2015/0092766 A1* | 4/2015 | Jean et al. ............ 370/350 |

* cited by examiner

METHOD AND APPARATUS FOR ASYNCHROSOUS POSITIONING OF WIRELESS BASE STATIONS

BACKGROUND

The usefulness of accurate positioning is well known. A typical form of location determination involves using a satellite-based positioning system, such as the Global Positioning System (GPS). While satellite-based positioning systems can be highly accurate, in some situations it may not be possible to receive signals from a sufficient number of satellite-based positioning system satellites to perform an accurate location determination of a wireless mobile device. For example, in a city dense with buildings, other positioning methods may be more accurate. Range-based positioning systems may be useful for mobile wireless devices that communicate with cellular network base stations. However, in order to determine a location based on ranging information with one or more base stations, the base station's location needs to be known. Many wireless service providers do not make the locations of their base stations publicly available, therefore the location of these base stations may need to be determined Such determination of the location of a base station may be referred to as "reverse positioning."

SUMMARY

Various arrangements for locating a base station are presented. In some embodiments, a method for determining a location of a base station without timing synchronization is presented. The method may include determining, by a first mobile device, that the first mobile device is moving faster than a threshold velocity. The method may include capturing, by the first mobile device, a first unsynchronized time of arrival (TOA) measurement, wherein the first unsynchronized TOA measurement is based on a first unsynchronized timing measurement of a first received reference signal. The method may include determining, by the first mobile device, a first location of the first mobile device, wherein the first location corresponds to the first unsynchronized TOA measurement. The method may include capturing, by the first mobile device, a second unsynchronized TOA measurement, wherein the second unsynchronized TOA measurement is based on a second unsynchronized timing measurement of a second received reference signal. The method may include determining, by the first mobile device, a second location of the first mobile device. The second location may correspond to the second unsynchronized TOA measurement. Based on the mobile device moving faster than the threshold velocity, the first location of the first mobile device, the second location of the first mobile device, the first unsynchronized TOA measurement, and the second unsynchronized TOA measurement may be used for determining the location of the base station.

Embodiments of such a method may include one or more of the following features: The first received reference signal and the second received reference signal may be positioning reference signals (PRS's) and the base station may be an eNode B. The first unsynchronized TOA measurement and the second unsynchronized TOA measurement may be measured based only on an unsynchronized clock of the first mobile device. The first unsynchronized TOA measurement and the second unsynchronized TOA measurement may be captured when the first mobile device is receiving PRS's from only the base station. The method may include transmitting, by the first mobile device, data based on the first unsynchronized TOA measurement, the second unsynchronized TOA measurement, the first location, and the second location to a server. The method may include receiving, by a server, from the first mobile device, data based on the first unsynchronized TOA measurement, the second unsynchronized TOA measurement, the first location, and the second location. The method may include calculating, by the server, a first time difference of arrival (TDOA) value based on the first unsynchronized TOA measurement and the second unsynchronized TOA measurement.

Additionally or alternatively, embodiments of such a method may include one or more of the following features: The method may include receiving, by the server, from a second mobile device, data based on a third unsynchronized TOA measurement, a fourth unsynchronized TOA measurement, a third location, and a fourth location. The method may include calculating, by the server, a second TDOA value based on the third unsynchronized TOA measurement and the fourth unsynchronized TOA measurement. Timing of the second mobile device may not be synchronized with timing of the first mobile device. The method may include calculating, by the server, the location of the base station using the first TDOA value, the second TDOA value, the first location, the second location, the third location, the fourth location, and a PRS period of the base station. Determining that the first mobile device is moving faster than the threshold velocity may include using a measurement from an accelerometer of the first mobile device. Determining, by the first mobile device, the first location of the first mobile device may include using a satellite-based positioning system.

In some embodiments, a system for determining a location of a base station without timing synchronization is presented. The system may include a first mobile device, comprising one or more processors and a memory communicatively coupled with and readable by the one or more processors and having stored therein processor-readable instructions. The instructions, when executed by the one or more processors, may cause the one or more processors to determine that the first mobile device is moving faster than a threshold velocity. The instructions, when executed, may cause the one or more processors to capture a first unsynchronized time of arrival (TOA) measurement, wherein the first unsynchronized TOA measurement is based on a first unsynchronized timing measurement of a first received reference signal. The instructions, when executed, may cause the one or more processors to determine a first location of the first mobile device, wherein the first location corresponds to the first unsynchronized TOA measurement. The instructions, when executed, may cause the one or more processors to capture a second unsynchronized TOA measurement, wherein the second unsynchronized TOA measurement is based on a second unsynchronized timing measurement of a second received reference signal. The instructions, when executed, may cause the one or more processors to determine a second location of the first mobile device. The second location may correspond to the second unsynchronized TOA measurement. The instructions, when executed, may cause the one or more processors to, based on the first mobile device moving faster than the threshold velocity, may use the first location of the first mobile device, the second location of the first mobile device, the first unsynchronized TOA measurement, and the second unsynchronized TOA measurement for determining the location of the base station.

Embodiments of such a system may include one or more of the following features: The first received reference signal and the second received reference signal may be positioning reference signals (PRS's) and the base station may be an eNode B. The first unsynchronized TOA measurement and the second unsynchronized TOA measurement may be measured based only on an unsynchronized clock of the first mobile device. The first unsynchronized TOA measurement and the second unsynchronized TOA measurement may be captured when the first mobile device is receiving PRS's from only the base station. The instructions, when executed, may cause the one or more processors to cause data based on the first unsynchronized TOA measurement, the second unsynchronized TOA measurement, the first location, and the second location to be transmitted to a server. The system may include a server, configured to receive, from the first mobile device, data based on the first unsynchronized TOA measurement, the second unsynchronized TOA measurement, the first location, and the second location. The server may be further configured to calculate a first time difference of arrival (TDOA) value based on the first unsynchronized TOA measurement and the second unsynchronized TOA measurement. The server may be further configured to receive from a second mobile device, data based on a third unsynchronized TOA measurement, a fourth unsynchronized TOA measurement, a third location, and a fourth location. The server may be further configured to calculate a second TDOA value based on the third unsynchronized TOA measurement and the fourth unsynchronized TOA measurement. The server may be further configured to timing of the second mobile device is not synchronized with timing of the first mobile device.

Additionally or alternatively, embodiments of such a system may include one or more of the following features: The server may be further configured to calculate the location of the base station using the first TDOA value, the second TDOA value, the first location, the second location, the third location, the fourth location, and a PRS period of the base station. The processor-readable instructions that cause the one or more processors of the first mobile device to determine that the first mobile device is moving faster than the threshold velocity may include processor-readable instructions which, when executed, cause the one or more processors to use a measurement from an accelerometer of the first mobile device. The processor-readable instructions that cause the one or more processors to determine the first location of the first mobile device may include processor-readable instructions which, when executed, cause the one or more processors to determine the first location of the first mobile device using a satellite-based positioning system.

In some embodiments, a non-transitory processor-readable medium for determining a location of a base station without timing synchronization is presented. The non-transitory processor-readable medium may include processor-readable instructions configured to cause one or more processors to determine that the first mobile device is moving faster than a threshold velocity. The processor-readable instructions may be further configured to cause the one or more processors to capture a first unsynchronized time of arrival (TOA) measurement, wherein the first unsynchronized TOA measurement is based on a first unsynchronized timing measurement of a first received reference signal. The processor-readable instructions may be further configured to cause the one or more processors to determine a first location of the first mobile device, wherein the first location corresponds to the first unsynchronized TOA measurement. The processor-readable instructions may be further configured to cause the one or more processors to capture a second unsynchronized TOA measurement, wherein the second unsynchronized TOA measurement is based on a second unsynchronized timing measurement of a second received reference signal. The processor-readable instructions may be further configured to cause the one or more processors to determine a second location of the first mobile device. The second location may correspond to the second unsynchronized TOA measurement. Based on the mobile device moving faster than the threshold velocity, the first location of the first mobile device, the second location of the first mobile device, the first unsynchronized TOA measurement, and the second unsynchronized TOA measurement may be used for determining the location of the base station.

Embodiments of such a non-transitory computer-readable medium may include one or more of the following: The first received reference signal and the second received reference signal may be positioning reference signals (PRS's) and the base station may be is an eNode B. The first unsynchronized TOA measurement and the second unsynchronized TOA measurement may be measured based only on an unsynchronized clock of the first mobile device. The first unsynchronized TOA measurement and the second unsynchronized TOA measurement may be captured when the first mobile device is receiving PRS's from only the base station. The processor-readable instructions may be further configured to cause the one or more processors to cause data based on the first unsynchronized TOA measurement, the second unsynchronized TOA measurement, the first location, and the second location to be transmitted to a server. The processor-readable instructions may be further configured to cause the one or more processors to calculate the location of the base station using the first TDOA value, the second TDOA value, the first location, the second location, the third location, the fourth location, and a PRS period of the base station. The processor-readable instructions configured to cause the one or more processors to determine that the first mobile device is moving faster than the threshold velocity may include processor-readable instructions configured to cause the one or more processors to use a measurement from an accelerometer of the first mobile device. The processor-readable instructions configured to cause the one or more processors to determine the first location of the first mobile device may include processor-readable instructions configured to cause the one or more processors to determine the first location of the first mobile device using a satellite-based positioning system.

In some embodiments, a system for determining a location of a base station without timing synchronization is presented. The system may include means for determining that the first mobile device is moving faster than a threshold velocity. The system may include means for capturing a first unsynchronized time of arrival (TOA) measurement, wherein the first unsynchronized TOA measurement is based on a first unsynchronized timing measurement of a first received reference signal. The system may include means for determining a first location of the first mobile device, wherein the first location corresponds to the first unsynchronized TOA measurement. The system may include means for capturing a second unsynchronized TOA measurement, wherein the second unsynchronized TOA measurement is based on a second unsynchronized timing measurement of a second received reference signal. The system may include means for determining a second location of the first mobile device. The second location may correspond to the second unsynchronized TOA measurement. Based on the first mobile device moving faster than the threshold velocity, the first location of the first mobile device, the second location of the first mobile device, the first unsynchronized TOA measurement, and the second unsynchronized TOA measurement may be used for determining the location of the base station.

Embodiments of such a system may include one or more of the following features: The first received reference signal and the second received reference signal may be positioning reference signals (PRS's) and the base station may be an eNode B. The first unsynchronized TOA measurement and the second unsynchronized TOA measurement may be measured based only on an unsynchronized clock of the first mobile device. The first unsynchronized TOA measurement and the second unsynchronized TOA measurement may be captured when the first mobile device is receiving PRS's from only the base station. The system may include means for transmitting data based on the first unsynchronized TOA measurement, the second unsynchronized TOA measurement, the first location, and the second location to a server. The system may include means for receiving from the first mobile device, data based on the first unsynchronized TOA measurement, the second unsynchronized TOA measurement, the first location, and the second location. The system may include means for calculating a first time difference of arrival (TDOA) value based on the first unsynchronized TOA measurement and the second unsynchronized TOA measurement. The system may include means for receiving from a second mobile device, data based on a third unsynchronized TOA measurement, a fourth unsynchronized TOA measurement, a third location, and a fourth location. The system may include means for calculating a second TDOA value based on the third unsynchronized TOA measurement and the fourth unsynchronized TOA measurement. Timing of the second mobile device may not be synchronized with timing of the first mobile device. The system may include means for calculating the location of the base station using the first TDOA value, the second TDOA value, the first location, the second location, the third location, the fourth location, and a PRS period of the base station. The means for determining that the first mobile device is moving faster than the threshold velocity may include using a measurement from a means for measuring acceleration of the first mobile device. The means for determining the first location of the first mobile device may include a satellite-based positioning system.

BRIEF DESCRIPTION OF THE DRAWINGS

A further understanding of the nature and advantages of various embodiments may be realized by reference to the following figures. In the appended figures, similar components or features may have the same reference label. Further, various components may be distinguished by following the reference label by a dash and a second label. If only the first reference label is used in the specification, the description is applicable to any one of the similar components having the same first reference label irrespective of the second reference label.

DETAILED DESCRIPTION

Figure 1:
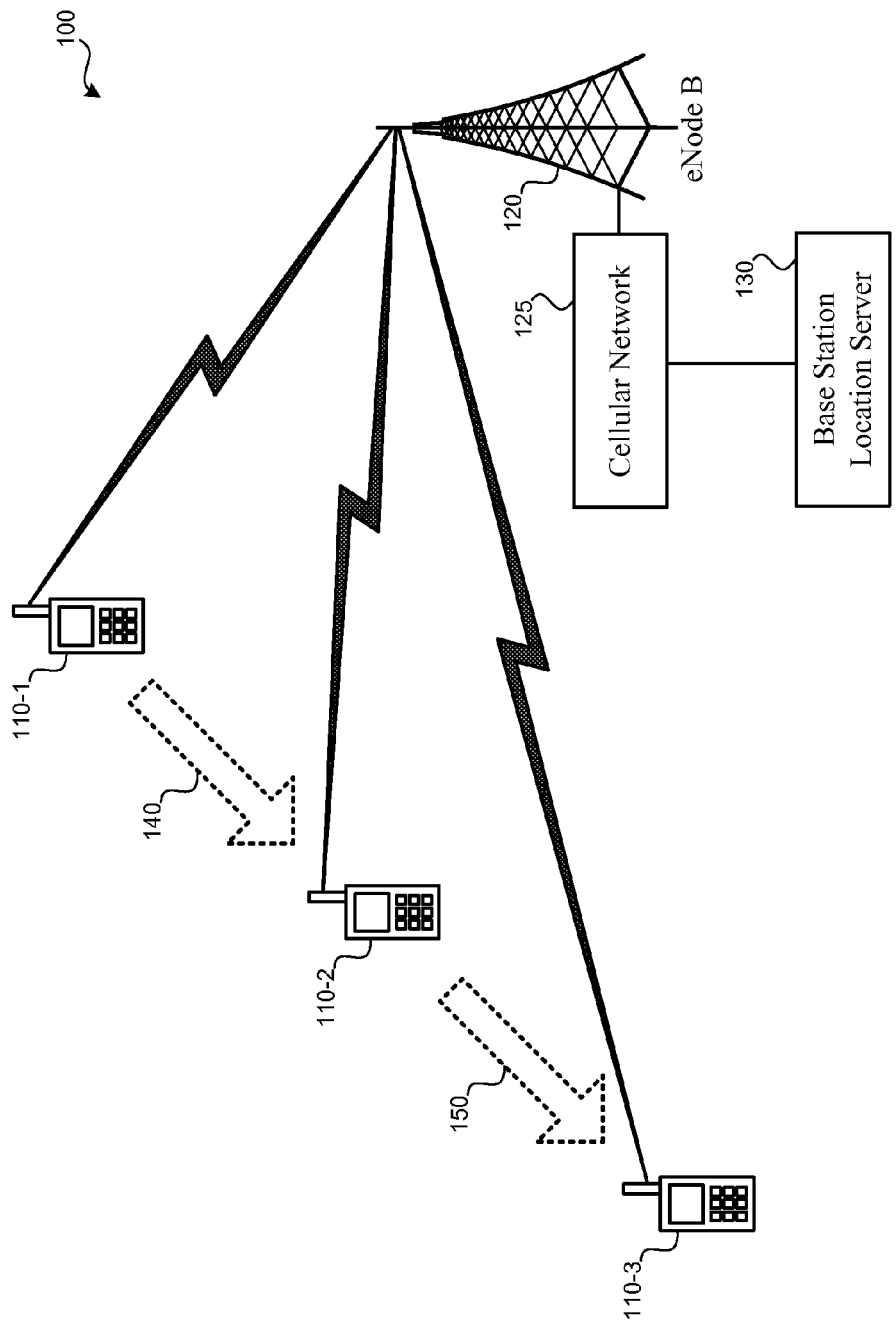
FIG. 1 illustrates an embodiment of a system for asynchronous positioning of a base station using a single mobile device.

Conventionally, to determine the range between a wireless mobile device and a base station for use in locating the base station, the timing of the mobile device needs to be synchronized with the base station or another base station. However, in embodiments detailed herein, such synchronization between the mobile device performing the ranging measurement and the base station (or another base station) is not needed. As such, use of the term asynchronous and unsynchronized refers to a lack of synchronization between the timing of the base station and the timing of the mobile device.

By making multiple time of arrival (TOA) measurements as measured using a clock of the mobile device and associated location measurements (e.g., via GPS), a location of the base station can be accurately determined TOA measurements may be made based on position reference signals (PRS's), which are broadcast at least by 4G LTE base stations (often referred to as enodeBs) according to a predefined timing pattern. As such, the amount of time that elapses between the broadcast of each PRS is predefined and known. In some arrangements, measurements are made by at least two mobile devices. At minimum, each mobile device may make two TOA measurements and two associated location measurements (e.g., using some other form of location determination, such as a satellite-based positioning system) that indicate the location of the mobile device at the approximate time of each TOA measurement. In some embodiments, all of the measurements may be made by a single mobile device. If a single mobile device is making all measurements, at minimum, the mobile device may make three TOA measurements and three locations of the mobile device, with each location corresponding to a TOA measurement. In some embodiments, the measurements may be made by two or more mobile devices. If two mobile devices are making the measurements, at minimum, each of the mobile devices may make two TOA measurements and two location measurements, with each location corresponding to a TOA measurement.

Whether TOA measurements are made by one mobile device or more than one mobile device, the TOA measurements may be used to create time difference of arrival (TDOA) values which may be used by a mobile device or a remote server to calculate the location of the base station using a known broadcast interval (frequency) of PRS's. At no point are the TOA measurements made by the mobile device synchronized with a clock of any other mobile device or any base station for performing the TOA measurements. Therefore, the measurements are made asynchronously—the TOA measurements are based solely on the clock of the mobile device performing the measurement.

Since no synchronization occurs between a mobile device's timing measurement system (e.g., the mobile device's clock) and any base station's timing system (e.g., the base station's clock), inaccuracies of the mobile device's timing device (e.g., clock drift) can adversely affect the accuracy of the TOA measurements. To counteract such an adverse effect, the amount of time allowed to elapse between TOA measurements (which are used in combination to calculate the TDOA value) may be decreased as much as practicable to limit the amount of error due to such clock inaccuracies. However, in order to obtain a TDOA value useful for calculating the location of the base station, a difference in the position of the mobile device may be needed between the first TOA measurement and the second TOA measurement. (For example, if the mobile device is motionless, the TOA measurements and position measurements would be the same, thus not allowing a TDOA value to be calculated. If the mobile device has moved only a small distance between the first TOA measurement and the second TOA measurement, the amount of error due to the frequency of the mobile device's clock and other factors may prevent a useful TDOA value from being calculated.) As such, movement of the mobile device may be monitored to determine when the mobile device is moving at a great enough speed such that two TOA measurements can be obtained within a threshold period of time at two locations separated by at least a threshold distance. In some embodiments, the movement of the mobile device may be monitored based on the locations measured using a satellite-based location arrangement and/or an accelerometer of the mobile device. If a large enough change in position within a certain period of time (velocity) is observed, then TOA measurements and locations of the mobile device may be captured for use in determining a location of the base station. These measured location and TOA measurements may be used locally by the mobile device or may be transmitted to a remote server system for use in determining the base station's location.

FIG. 1 illustrates an embodiment of a system 100 for asynchronous positioning of a base station using a single mobile device. In system 100, multiple TOA measurements are made by a single mobile device 110. Mobile device 110 is illustrated in FIG. 1 at three different locations. Mobile device 110-1 is at a first location; after a first period of time, mobile device 110 is at a second location (represented by mobile device 110-2); after a second period of time, mobile device 110 is at a third location (represented by mobile device 110-3). Therefore, mobile device 110-1, mobile device 110-2, and mobile device 110-3 represent a single mobile device (mobile device 110) at different locations and at different times. While three locations of mobile device 110 at which TOA measurements are made are illustrated, it should be understood that mobile device 110 may make TOA measurements for a greater number of locations or a fewer number of locations. For instance, the greater number of TOA measurements made at different locations, the greater the accuracy of the location of base station 120 may be determined.

Mobile device 110 may be a wireless mobile device, such as a cellular phone. Mobile device 110 may represent any type of wireless device that can be moved and can communicate with a cellular network, such as a tablet computer. Mobile device 110 may be configured to communicate with base stations of Long Term Evolution (LTE) cellular networks. At least some LTE cellular networks may broadcast a periodic signal called a Positioning Reference Signal (PRS). Mobile device 110 may be configured to receive such PRS's.

System 100 may include a base station 120. Base station 120 may be a base station of a cellular network, such as cellular network 125. Base station 120, which may be part of a LTE cellular network, may be referred to as an eNodeB (eNB). An eNodeB may be a type of base station specific to 4G LTE cellular networks. Base station 120 may periodically broadcast PRS's. Each PRS may indicate an identity of base station 120. Base station 120 may be part of cellular network 125. Cellular network 125, which may be a 4G LTE network, may include multiple base stations, each of which may broadcast PRS's.

In the illustrated embodiment of system 100, only base station 120 is in communication with mobile device 110. Therefore, other base stations of the wireless network (and, possibly, other wireless networks) may be unable to communicate with mobile device 110. Regardless of mobile device 110 only being in communication with base station 120 of the wireless network, asynchronous TOA measurements may be made by mobile device 110 and used for determining the location of base station 120. In other embodiments, mobile device 110 may be in communication with one or more base stations in addition to base station 120. Such base station may or may not be part of cellular network 125. However, no synchronization or other timing information from such additional base stations may be used for measurement of TOA measurements by mobile device 110.

To receive PRS's from base station 120, it may not be necessary for mobile device 110 to be authorized for access to cellular network 125 with which base station 120 communicates. Rather, since PRS's may be broadcast with an identifier of the broadcasting base station, mobile device 110 may receive PRS's from base station 120 along with an identifier of base station 120 without necessarily being authorized to access cellular network 125.

Mobile device 110 may be configured to communicate with base station location server 130. In order to communicate with base station location server 130, mobile device 110 may use base station 120 (i.e., the base station for which TOA measurements are being measured) to access base station location server 130 via cellular network 125. Alternatively, mobile device 110 may communicate with base station location server 130 via an alternate communication path. For example, a 802.11 wireless access point may be used by mobile device 110 to communicate with base station location server 130 via the Internet. Mobile device 110 may also communicate with base station location server 130 via another base station of cellular network 125 or via a base station of some other cellular network.

Communication may occur between mobile device 110 and base station location server 130 via cellular network 125. Communication between cellular network 125 and base station location server 130 may involve communication via the Internet or some other network that enables communication between cellular network 125 and base station location server 130. Base station location server 130 may be configured to calculate the location of base stations, including base station 120, based on TOA measurements and location measurements received from mobile devices, including mobile device 110. Therefore, base station location server 130 may serve to: first, determine the location of base station 120; and second, store the determined location of base station 120. Once the location of base station 120 has been determined with sufficient accuracy, TOA measurements between mobile devices and base station 120 may be used in determining the locations of the mobile devices in conjunction with the determined location of base station 120 stored by base station location server 130.

In system 100, a TOA measurement may be made by mobile device 110-1. This TOA measurement is made at a first location at a first time. The TOA measurement made by mobile device 110-1 may be made based on a PRS being received from base station 120. The TOA measurement may indicate a timestamp made in reference to only a clock of mobile device 110-1. As such, the TOA measurement made by mobile device 110-1 may not be synchronized with any clock external to mobile device 110-1. Therefore, the TOA measurement made by mobile device 110-1 is not synchronized with a clock of base station 120, cellular network 125, base station location server 130, or any other base station. The TOA measurement made by mobile device 110-1 may indicate a timestamp indicative of a clock counter or some other measurement of time locally maintained by mobile device 110-1. This timestamp may indicate the value of the clock counter at the time the PRS was received by mobile device 110-1.

In association with the TOA measurement captured by mobile device 110-1, a location of mobile device 110-1 may be measured. Therefore, the TOA measurement will have occurred at a known location. The location may be measured using a satellite-based positioning system, such as the Global Positioning System (GPS). Triangulation or trilateration using other base stations (which may or may not be part of cellular network 125) may also be used. Other location-determining methods for mobile device 110 are also possible. Ideally, the location of mobile device 110-1 may be determined at the instance the TOA measurement is performed. However, the location measurement may also be performed within a period of time before or after the TOA measurement. For instance, in most situations, it can be assumed that the mobile device will not be travelling with a velocity of greater than a certain magnitude, such as 75 MPH. Therefore, in this example, if the location measurement is conducted within a second, the location measurement may be considered sufficiently accurate (because the mobile device will be assumed to, at worst, be within 0.02 miles of the TOA measurement location.

Mobile device 110-2, which represents mobile device 110-1 at a different location and at a later time, may capture a second TOA measurement. This second TOA measurement may be based on a PRS transmitted by base station 120 (at some time after the PRS received by mobile device 110-1). PRS's transmitted by base station 120 may be at fixed time intervals. Therefore, it is predetermined how much time will elapse between consecutive broadcasts of PRS's by base station 120. Such a fixed interval may be referred to as a PRS period. For instance, base station 120 may transmit a PRS every 160 ms. The PRS period may be selected by the operator of cellular network 125. For instance, PRS periods may be 160 ms, 320 ms, 640 ms, or 1280 ms according to the LTE Positioning Protocol (LPP) standard. It may be possible to use PRS periods of some other time according to some other protocol. The PRS used by mobile device 110-2 for the second TOA measurement may be the PRS broadcast immediately following the PRS used by mobile device 110-1 for the first TOA measurement or may be a later broadcast PRS (such that other PRS's were broadcast by base station 120 between the PRS's used for the TOA measurements by mobile device 110-2 and mobile device 110-1).

In association with the TOA measurement captured by mobile device 110-2, a location of mobile device 110-2 may be measured. Therefore, the second TOA measurement will also have occurred at a known location. The location of mobile device 110-2 may be performed similarly to the location determination of mobile device 110-1.

Since the PRS period is at least tens or hundreds of milliseconds, it may be possible to determine: the PRS period and how many PRS periods have elapsed between mobile device TOA measurements based on received PRS's. While changes in the distance between base station 120 and mobile device 110 will affect the travel time of the PRS to mobile device 110, since the PRS is moving at such a high rate (about 300,000 km/s), the PRS period and the number of elapsed PRS periods between TOA measurements can be accurately calculated.

The TOA measurement made by mobile device 110-1 and the TOA measurement made later by mobile device 110-2 may be used to calculate a time difference of arrival (TDOA) value. The TDOA value may be calculated by subtracting the first measured TOA measurement from the second measured TOA measurement and factoring in the amount of time that elapsed between the broadcast of the measured reference signals. More specifically, the below equations detail how TDOA values may be calculated.

$$t_1 = T_1 + dt_1 + TOF_1 \quad \text{Equation 1}$$

$$t_2 = T_2 + dt_2 + TOF_2 \quad \text{Equation 2}$$

In equations 1 and 2, $T_1$ and $T_2$ indicates the local time at a base station from which PRS's were transmitted by the base station. $t_1$ and $t_2$ indicate the TOA measurements at the mobile station. $dt_1$ and $dt_2$ represent the timing differences between the base station and the mobile device. Since the values are similar, $dt_1$ can be approximated to be equal to $dt_2$. $TOF_1$ and $TOF_2$ represent the time of flight of the reference signal from the base station to the mobile device. Subtracting equation 1 from equation 2 results in equation 3, which can be used to compute the TDOA value.

$$TDOA = TOF_2 - TOF_1 = (t_2 - t_1) - T \quad \text{Equation 3}$$

In equation 3, T represents $T_1$ subtracted from $T_2$. T is known, based on the amount of time that has elapsed between broadcast of the PRS signals (which would be the PRS period multiplied by the number of elapsed PRS periods).

Mobile device 110-3, which represents mobile device 110-2 and mobile device 110-1 at a different location and at a later time, may capture a third TOA measurement. This third TOA measurement may be based on a PRS transmitted by base station 120 (at some time after the PRS used by mobile device 110-1 for the first TOA measurement and after the PRS used by mobile device 110-2 for the second TOA measurement). The PRS used by mobile device 110-3 for the third TOA measurement may be the PRS broadcast immediately following the PRS received by mobile device 110-2 or may be a later broadcast PRS (such that other PRS's were broadcast by base station 120 between the PRS's used for the TOA measurements by mobile device 110-3 and mobile device 110-2).

In association with the TOA measurement captured by mobile device 110-3, a location of mobile device 110-3 may be measured. Therefore, the third TOA measurement will also have occurred at a known location. The location of mobile device 110-3 may be performed similarly to the location determination of mobile device 110-1 and mobile device 110-2.

Dotted arrow 140 and dotted arrow 150 indicate the change in position of mobile device 110 between the TOA measurements made at 110-1, 110-2, and 110-3. TOA measurements may only be made or may only be used in determining the position of base station 120 when the mobile device is determined to be moving at greater than a threshold velocity. This threshold velocity may be determined by positioning mobile device 110 multiple times to determine it is moving. Also, a movement detection device, such as an accelerometer, may be used to determine a velocity of mobile device 110. As such, whether TOA measurements and associated location measurements of mobile device 110 are collected may be at least partially based on if mobile device 110 is determined to be moving at a sufficient velocity.

Since the measurements made by mobile device 110 are asynchronous (not synchronized with any clock besides the clock of mobile device 110), clock drift of mobile device 110 may negatively affect the accuracy of the TOA measurements. To limit the extent of this negative effect, the velocity of mobile device 110 may serve as a condition for when TOA measurements are permitted to occur. The velocity of mobile device 110 may be monitored to ensure multiple TOA measurements are conducted by mobile device 110 within a threshold period of time with the locations of the TOA measurements sufficiently separated as to be useful in determining the location of base station 120.

The TOA measurement made by mobile device 110-2 and the TOA measurement made later by mobile device 110-3 may be used to calculate another TDOA value. The TDOA value may be calculated by subtracting the second measured TOA measurement from the third measured TOA measurement. A TDOA value may also be calculated, using the first TOA measurement made by mobile device 110-1 and the third TOA measurement made by mobile device 110-3.

Each TDOA value is associated with two TOA measurements, which are each associated with two location measurements of the mobile device. Therefore, for a TDOA measurement, there are two locations of the mobile device. This TDOA value, in conjunction with the two associated locations, may be used for determining the location of base station 120. To determine the location of base station 120, at least two TDOA values may be needed, with each TDOA value being associated with two locations of the mobile device used to capture the TOA measurements. Once a sufficient number of TDOA values and locations have been obtained, the location of the base station may be calculated. The location of the base station calculated may be two-dimensional. (An altitude of the base station may be determined using a terrain database or map.) In some embodiments, a weighted least squares method is used for calculating the location of the base station from the TDOA values and mobile device locations. Calculation of a location using TDOA values and locations at which the TOA measurements may use the known PRS period to determine the amount of time that has elapsed between times when the PRS for each TOA measurement of a TDOA was broadcast. Such calculation may be performed by base station location server 130 or by mobile device 110. In some embodiments, the TOA measurements and associated locations are transmitted to base station location server 130. In some embodiments, the TDOA values and associated locations are transmitted to base station location server 130. In some embodiments, the location of base station 120 is calculated by mobile device 110 and transmitted to base station location server 130. Also, in some embodiments, no TOA, TDOA, or location data may be transmitted to base station location server 130.

Therefore, it may be possible that a single mobile device, which may not be in communication with any other base station, may be used to capture the TOA measurements and the location measurements necessary to calculate the location of base station 120. Further, the single mobile device may perform such measurements asynchronously, without the clock of the mobile device being synchronized to any base station clock, cellular network clock, or any signal.

Figure 2:
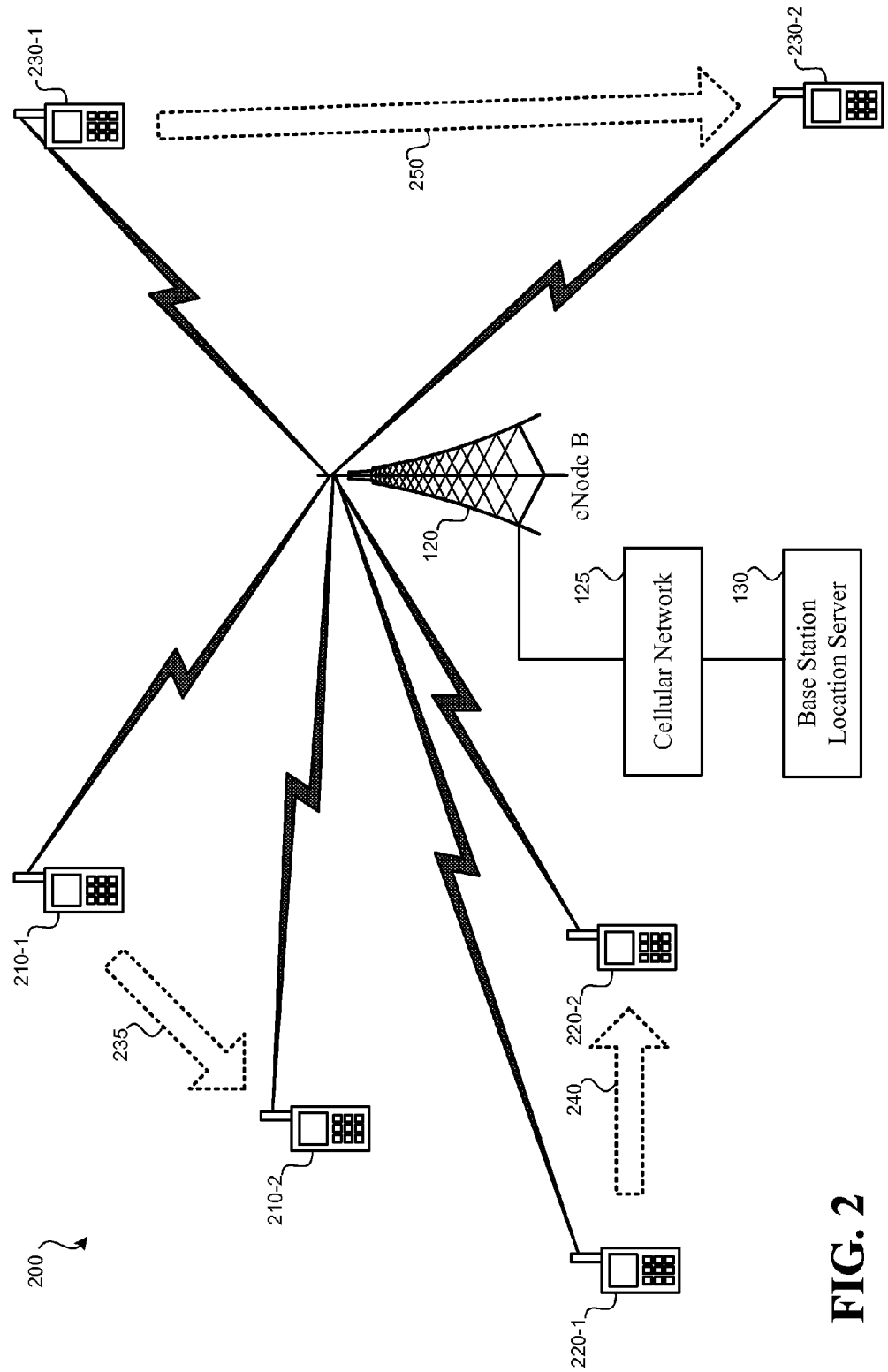
FIG. 2 illustrates an embodiment of a system for asynchronous positioning of a base station using three mobile devices.

FIG. 2 illustrates an embodiment of a system for asynchronous positioning of a base station using three mobile devices. While system 100 of FIG. 1 focused on TOA and location measurements being made by a single mobile device 110, system 200 of FIG. 2 focuses on three mobile devices being used to each capture TOA measurements of PRS's and location measurements for use in determination the location of base station 120. FIG. 2 illustrates three different mobile devices (210, 220, and 230), with each mobile device being illustrated at two locations at two different times. Mobile device 210 is illustrated at two locations at two different times. Mobile device 210 is represented as at a first location and a first time by mobile device 210-1 and is represented as at a second location at a second time by mobile device 210-2. Mobile device 220 is illustrated at two locations at two different times. Mobile device 220 is represented as at a first location and a first time by mobile device 220-1 and is represented as at a second location at a second time by mobile device 220-2. Mobile device 230 is illustrated at two locations at two different times. Mobile device 230 is represented as at a first location and a first time by mobile device 230-1 and is represented as at a second location at a second time by mobile device 230-2.

In system 200, two TOA measurements and associated location measurements are made by each mobile device of the three mobile devices. It should be understood that in alternate embodiments of system 200 greater numbers (e.g., four or more) or fewer numbers (e.g., two) of mobile devices may be used to determine the position of base station 120. Also, in other embodiments, each mobile device may gather a greater number of TOA measurements which may be used for calculating the position of base station 120.

In system 200, base station 120, cellular network 125, and base station location server 130 may function as described in relation to system 100 of FIG. 1. Further, the functionality of mobile devices 210, 220, and 230 may be the same or similar to mobile device 110 of system 100 of FIG. 1. Accordingly, base station 120 may be an eNB and may periodically broadcast PRS's. Mobile devices 210, 220, and 230 may be configured to communicate via an LTE cellular network and receive such PRS's.

In system 200, a TOA measurement may be made by mobile device 210-1. This TOA measurement is made at a first location at a first time. The TOA measurement made by mobile device 210-1 may be made based on a PRS being received from base station 120. The TOA measurement may indicate a timestamp made in reference to only a clock of mobile device 210-1. As such, the TOA measurement made by mobile device 210-1 may not be synchronized with any clock signal or other signal external to mobile device 210-1. Therefore, the TOA measurement made by mobile device 210-1 is not synchronized with a clock of base station 120, cellular network 125, base station location server 130, any other base station or any other mobile device. The TOA measurement made by mobile device 210-1 may indicate a timestamp indicative of a clock counter or some other measurement of time locally maintained by mobile device 110-1. This timestamp may indicate the value of the clock counter at the time the PRS was received by mobile device 210-1.

In association with the TOA measurement captured by mobile device 210-1, a location of mobile device 210-1 may be measured. Therefore, the TOA measurement will have occurred at a known location. The location may be measured using a satellite-based positioning system, such as the Global Positioning System (GPS). Triangulation or trilateration using other base stations (which may or may not be part of cellular network 125) may also be used. Other location determining methods for mobile device 210 are also possible. Ideally, the location of mobile device 210-1 may be determined at the instance the TOA measurement is performed. However, the location measurement may also be performed within a period of time before or after the TOA measurement.

Mobile device 210-2, which represents mobile device 210-1 at a different location and at a later time, may capture a second TOA measurement. This second TOA measurement may be based on a PRS transmitted by base station 120 (at some time after the PRS received by mobile device 210-1). PRS's transmitted by base station 120 may be at fixed time intervals. Therefore, it is predetermined how much time will elapse between consecutive broadcasts of PRS's by base station 120. Such a fixed interval may be referred to as a PRS period. The PRS used by mobile device 210-2 for the second TOA measurement may be the PRS broadcast immediately following the PRS used by mobile device 210-1 for the first TOA measurement or may be a later broadcast PRS (such that other PRS's were broadcast by base station 120 between the PRS's used for the TOA measurements by mobile device 110-2 and mobile device 110-1).

In association with the TOA measurement captured by mobile device 210-2, a location of mobile device 110-2 may be measured. Therefore, the second TOA measurement will also have occurred at a known location. The location of mobile device 210-2 may be performed similarly to the location determination of mobile device 210-1.

Dotted arrow 235 indicates the change in position of mobile device 210 between the collected TOA measurements. TOA measurements may only be made or may only be used in determining the position of base station 120 when mobile device 210 is determined to be moving at greater than a threshold velocity. This threshold velocity may be determined by positioning mobile device 210 multiple times to determine it is moving at a sufficient speed. Also, a movement detection device, such as an accelerometer, may be used to determine a velocity of mobile device 210. As such, whether TOA measurements and associated location measurements of mobile device 210 are collected may be at least partially based on if mobile device 210 is determined to be moving at a sufficient velocity.

Since the measurements made by mobile device 210 are asynchronous (not synchronized with any clock besides the clock of mobile device 210), clock drift of mobile device 210 may negatively affect the accuracy of the TOA measurements. To limit the extent of this negative effect, the velocity of mobile device 210 may serve as a condition for when TOA measurements are permitted to occur. The velocity of mobile device 210 may be monitored to ensure multiple TOA measurements are conducted by mobile device 210 within a threshold period of time with the locations of the TOA measurements sufficiently separated as to be useful in determining the location of base station 120.

Mobile device 220 represents a different mobile device from mobile device 210. At least two TOA measurements and associated location measurements may be made by mobile device 220 similarly to as described in relation to mobile device 210. The measurements conducted by mobile device 220 may be based on the same PRS's, some of the same PRS's, or PRS's different from the measurements made by mobile device 210. Each PRS used by mobile device 220 may be broadcast by base station 120. The PRS's originate from the same base station, but the location and, possibly, time of the TOA measurements by mobile device 220 vary. The clock (and associated clock drift) of mobile device 220 may vary from mobile device 210. Since the TOA measurements are asynchronous, there is no timing synchronization between mobile device 210 and mobile device 220. As described in relation to mobile device 210, mobile device 220 may be required to be moving at greater than a threshold velocity. Therefore, a change in position sufficient to obtain a useful TDOA value may be present between measurement of TOA measurements by mobile device 220. Movement of mobile device 220 is represented by dotted arrow 240.

Mobile device 230 represents a different mobile device from mobile device 210 and mobile device 220. At least two TOA measurements and associated location measurements may be made by mobile device 230 similarly to as described in relation to mobile device 210 and mobile device 220. The measurements conducted by mobile device 230 may be based on the same PRS's, some of the same PRS's, or different PRS's than the measurements made by mobile device 210 and/or mobile device 220. Each PRS used for TOA measurements by mobile device 230 may be broadcast by base station 120. The PRS's originate from the same base station, but the location and, possibly, time of the TOA measurements by mobile device 230 vary. The clock (and associated clock drift) of mobile device 230 may vary from mobile device 210 and mobile device 220. Since the TOA measurements by mobile device 230 are asynchronous, there is no timing synchronization between mobile device 230, mobile device 210, and/or mobile device 220. As described in relation to mobile device 210, mobile device 230 may be required to be moving at greater than a threshold velocity. Therefore, a change in position sufficient to obtain a useful TDOA value may be present between measurement of TOA measurements by mobile device 230. Movement of mobile device 230 is represented by dotted arrow 250.

The TOA measurements made by mobile devices 210, 220, and 230 may be used to calculate TDOA values (at least one TDOA value for each mobile device). For each TDOA value, two associated determined locations of the mobile device which performed the TOA measurements are present. The clock for each of these mobile devices may exhibit different drift and are not synchronized. The TDOA values may be calculated by the individual mobile devices and transmitted, along with the associated location data, to base station location server 130. In some embodiments, the TOA measurements and associated location data are transmitted to base station location server 130, which may calculate the TDOA values.

TDOA values, based on the TOA measurements from multiple mobile devices, may be used by base station location server 130 to calculate the location of base station 120. The TDOA values and the location data from multiple mobile devices, along with the known PRS period for base station 120, may be used in calculating the location of base station 120. The location of base station 120 can then be used for calculating the location of mobile devices.

Figure 3:
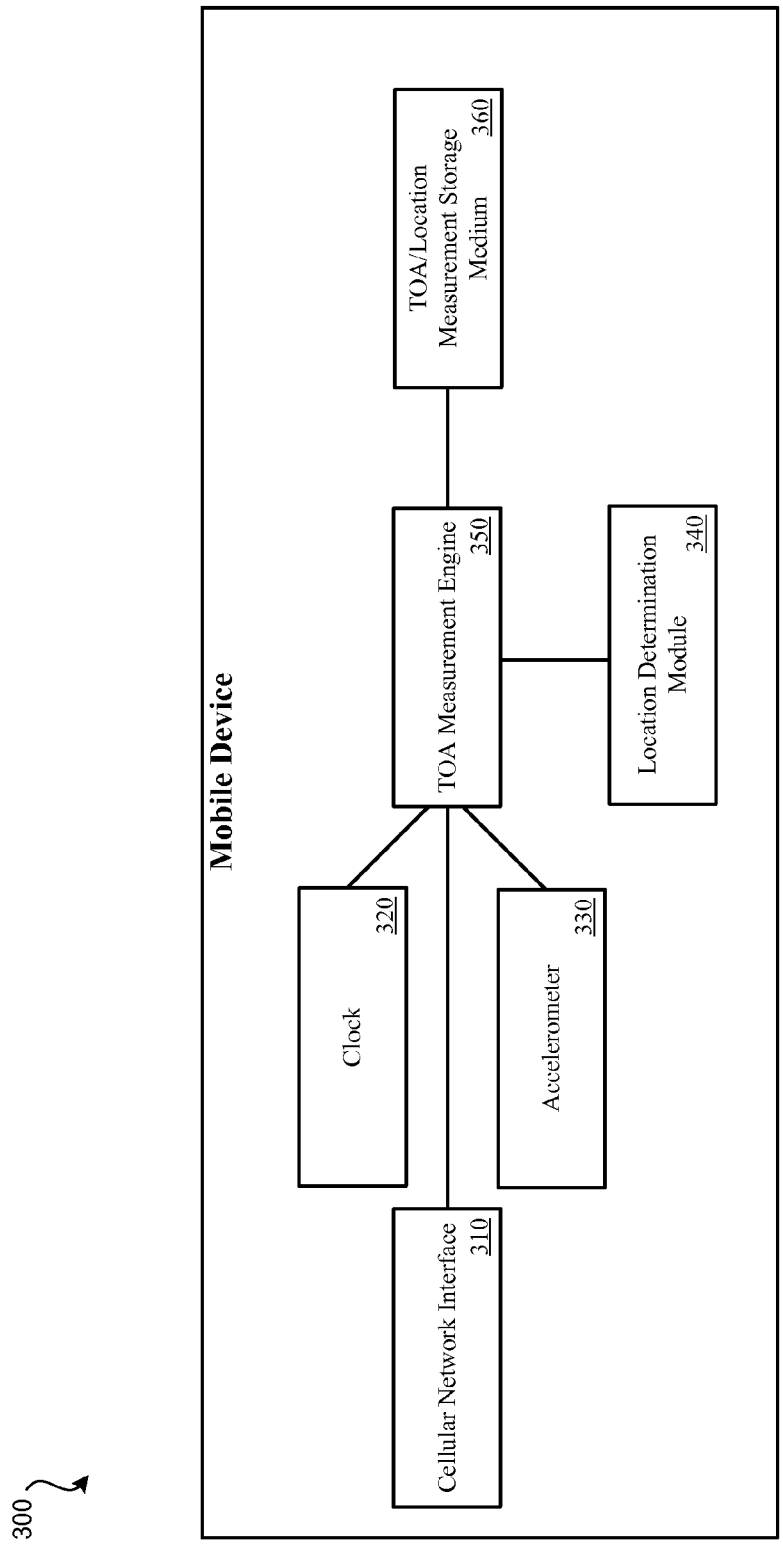
FIG. 3 illustrates an embodiment of a mobile device configured for use in asynchronous positioning of a base station.

FIG. 3 illustrates an embodiment of a mobile device 300 configured for use in asynchronous positioning of a base station. Mobile device 300 may represent a simplified block diagram of mobile device 110 of FIG. 1 and mobile device 210, 220, and 230 of FIG. 2. Mobile device 300 may be at least partially computerized. As such, one or more components and one or more instances of such components of computer system 700 of FIG. 7 may be incorporated as part of mobile device 300. The illustrated embodiment of mobile device 300 includes: cellular network interface 310, clock 320, accelerometer 330, TOA measurement engine 350, location determination module 340, and TOA/Location Measurement storage medium 360.

Cellular network interface 310 may serve as a communication interface between mobile device 300 and one or more base stations. For example, referring to FIG. 1, cellular network interface 310 may serve to send and/or receive data to/from base station 120. Such data which may be received by cellular network interface 310 includes PRS's. Therefore, cellular network interface 310 may be configured to communicate using LTE cellular networks or some other form of cellular wireless network that transmits reference signals at defined timing intervals.

Clock 320 may be a locally maintained clock of mobile device 300. Therefore, clock 320 may not be synchronized with any other clock or signal external to mobile device 300. Accordingly, when clock 320 is used for timing measurements (e.g., TOA measurements), error caused by drift or other inaccuracies of clock 320 may remain uncorrected. For example, clock drift of clock 320 that occurs between two TOA measurements may remain uncorrected. Therefore, it may be desirable to decrease, as much as possible, the amount of time between TOA measurements performed by mobile device 300 to decrease the effect of such clock errors.

Mobile device 300 may have one or more components that can be used to determine when mobile device 300 is traveling at a sufficient velocity such that TOA measurements can be taken within a threshold period of time and be separated by at least a threshold distance. In some embodiments, mobile device 300 has accelerometer 330. Accelerometer 330 may be used to determine when mobile device 300 is moving at a sufficient velocity. In some embodiments, in addition to or instead of accelerometer 330, a location determination module 340 may be used to determine a velocity of mobile device 300. In some embodiments, a location determination module 340 may be a satellite-based positioning system module, which may use GPS or another satellite-based positioning system. The position of mobile device 300 may be monitored over time by location determination module 340 to determine if mobile device 300 is moving at least a threshold distance within a threshold period of time (e.g., mobile device 300 has at least a threshold velocity).

Mobile device 300 is illustrated as having accelerometer 330 and location determination module 340. Other embodiments of mobile device 300 may have some other form of module that is configured to determine a velocity of mobile device 300. TOA measurement engine 350 may monitor data output by accelerometer 330 and/or location determination module 340 to determine if mobile device 300 is traveling a sufficient velocity to perform asynchronous location measurements of a base station. If TOA measurement engine 350 determines mobile device 300 is traveling at a velocity greater than a predefined threshold velocity, TOA measurements may be performed. TOA measurement engine 350 may record a time, based on clock 320, of a PRS received by cellular network interface 310. TOA measurement engine 350 may record an indication of the time (such as a clock tick count) to TOA/location measurement storage medium 360. TOA measurement engine 350, at the same or approximately the same time as which the PRS TOA measurement was collected, may request and/or receive a location of mobile device 300 from location determination module 340. This location may be in the form of latitude and longitude coordinates (and, possibly, an altitude). The location collected by TOA measurement engine 350 from location determination module 340 may be collected within a threshold period of time of the TOA of the PRS received by cellular network interface 310 being determined. For example, the location of mobile device 300 may be collected by TOA measurement engine 350 within one second before or after the TOA of the PRS is measured. The location may be recorded by TOA measurement engine 350 to TOA/location measurement storage medium 360 in association with the measured TOA.

Such TOA measurements by mobile device 300 may be repeated. The TOA measurements may only be repeated as long as the velocity of mobile device 300 is sufficient so that, within a threshold period of time, the location of mobile device 300 has changed by at least a threshold amount. Further, it may also be required that mobile device 300 remain in communication range of the base station that has an unknown position such that PRS's can be received by the mobile device from the base station.

Upon request from a base station location server or once a predefined number of TOA/location measurements have been collected, the TOA and location measurements may be transmitted to a base station location server. In some embodiments, rather than mobile device 300 transmitting TOA measurements to the base station location server, TOA measurement engine 350 may calculate TDOA values. These TDOA values may be transmitted to the base station location server for use in calculating a location of the base station from which the PRS's were received by the mobile device. In some embodiments, if mobile device 300 computes a sufficient number of TDOA values, the location of the base station may be calculated.

TOA/location measurement storage medium 360 may represent a non-transitory computer readable storage medium. TOA/location measurement storage medium 360 may be used to, at least temporarily, store TOA measurements based on clock 320 and location measurements from location determination module 340 associated with each TOA measurement. Once such TOA measurements or TDOA values, calculated using the TOA measurements, are transmitted to a base station location server, the values may be deleted from TOA/location measurement storage medium 360.

Figure 4A:
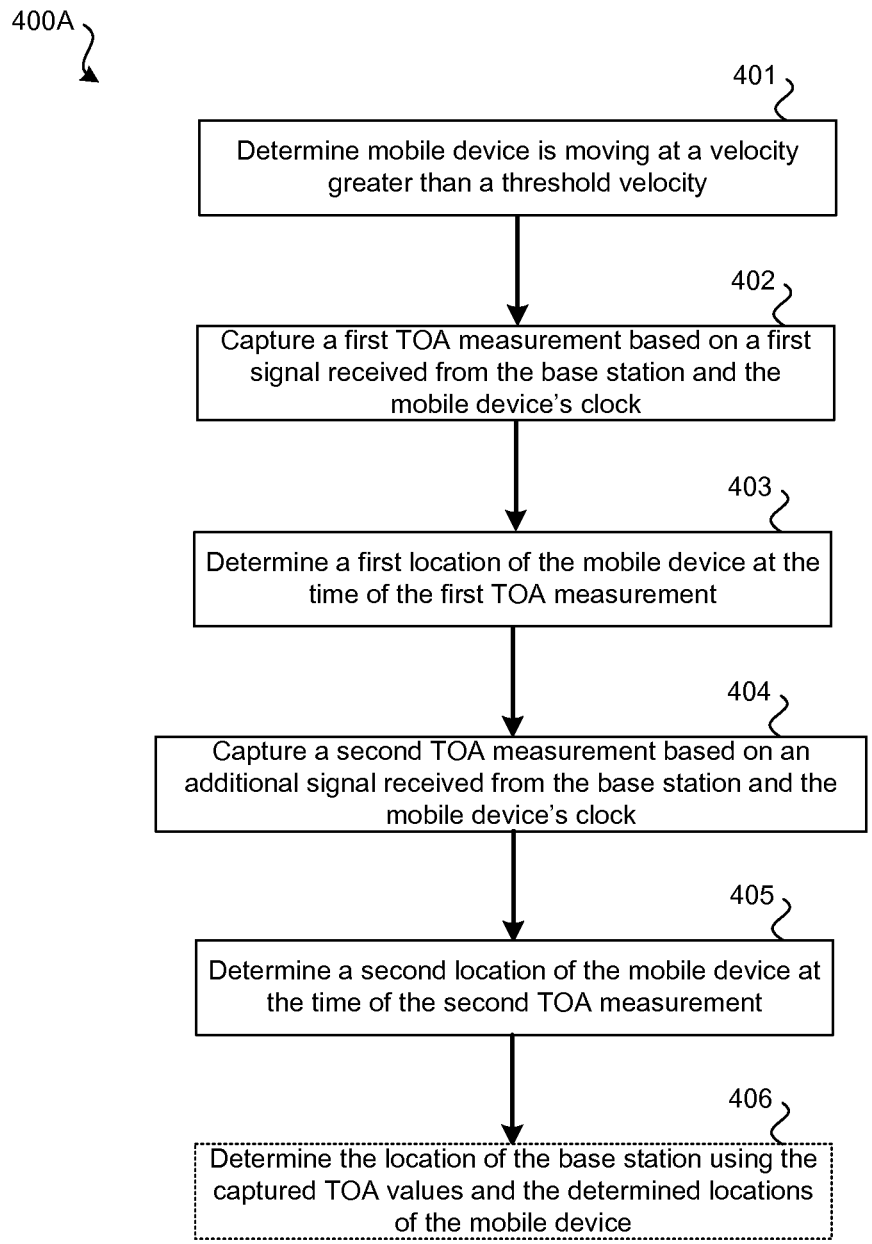
FIG. 4A illustrates an embodiment of a method for using a single mobile device for asynchronous positioning of a base station.

FIG. 4A illustrates an embodiment of a method 400A for using a single mobile device for asynchronous positioning of a base station. Method 400A may correspond to system 100 of FIG. 1. Each block of method 400A may be performed by a mobile device, such as mobile device 110 of FIG. 1. Accordingly, mobile device 300 of FIG. 3 may be used to perform each block of method 400A, unless otherwise noted. Further, the mobile device used to perform method 400A may include one or more instances of computerized components, such as detailed in relation to FIG. 7. Accordingly, means for performing each block of method 400A, unless otherwise noted, may include one or more instances of the components of mobile device 300 of FIG. 3 and/or one or more instances of the components of computer system 700 of FIG. 7. Further, instances of the components of system 100 may be used in performing method 400A.

At block 401, it may be determined whether the mobile device is moving at a velocity greater than a threshold velocity. TOA measurements may only be captured by the mobile device if the mobile device has been determined to be moving at greater than a threshold velocity. Such a condition may ensure TOA measurements are taken at a sufficient distance from each other while minimizing the amount of clock drift that may occur between TOA measurements. The mobile device may assess whether it is moving at a sufficient velocity based on measurements obtained from the accelerometer of the mobile device or from positioning measurements collected via a satellite-based positioning system, such as GPS. The velocity (or change in position over time) of the mobile device may be compared to a stored, predefined velocity value defined to be the threshold velocity. In some embodiments, the threshold velocity is 10 MPH, 15 MPH, 20 MPH, 25 MPH, 30 MPH or higher. Other values (e.g., any velocity between any of these values) may also be defined to be the threshold. If the mobile device is moving at a velocity matching and/or greater than the threshold velocity, TOA and location measurements may be eligible to be collected and/or used for determining the location of the base station. Other forms of determining the mobile device is moving at a sufficient velocity may also be possible. In some embodiments, rather than making collection of TOA measurements and/or location measurements contingent on the mobile device moving a sufficient velocity, the measurements may be made, but only used in determining the location of the base station if the mobile device is determined to be moving at a sufficient velocity. As such, velocity may be measured to determine whether TOA measurements and location measurements should be used or ignored. Means for performing block 401 include the components of mobile device 300. More specifically, means for performing block 420 include an accelerometer and a satellite-based positioning system.

At block 402, a first TOA measurement may be collected by the mobile device. The first TOA measurement may indicate when a PRS was received from the base station. The timing of the TOA measurement collected at block 402 may be based on a local clock of the mobile device. This local clock of the mobile device may not be synchronized with any clock external to the mobile device or any signal external to the mobile device. Therefore, the mobile device performing block 402 is not synchronized with the base station which broadcast the PRS or any other base station (of the cellular network of the base station or some other cellular network). Accordingly, the mobile device performing block 402 may be in communication with only the base station having the unknown location. The indication of the time at which the first PRS from the base station having the unknown location is received may be recorded by the mobile device, such as in the form of a clock tick count to a non-transitory computer-readable storage medium of the mobile device. Means for performing block 402 include the components of mobile device 300. More specifically, means for performing block 402 include a cellular network interface configured to receive PRS's and a TOA measurement engine, which may be implemented using one or more processors. Means for recording the TOA measurement may include a non-transitory computer-readable storage medium.

At block 403, a location of the mobile device at the time of the first TOA measurement may be determined Ideally, determination of the location at block 403 may occur at the same time as the first TOA measurement of block 402. However, in some embodiments, it may be acceptable for the location measurement of the mobile device to be collected within a threshold period of time of the TOA measurement at block 403 being measured. For example, the location determined at block 403 may be determined within one second of the TOA measurement of block 402. The location determined at block 403 may be stored in associated with the clock tick count of block 402. Means for performing block 403 include the components of mobile device 300, including a non-transitory computer-readable storage medium. More specifically, means for performing block 403 also include a location determination module, such as a satellite-based positioning system (e.g., GPS).

At block 404, a second TOA measurement may be performed by the mobile device. This second TOA measurement is performed based on another, later PRS broadcast by the same base station. The amount of time that elapses between the TOA measurement at block 402 and the TOA measurement that occurs at block 404 may be based on multiple factors, including one or more of: the velocity of the mobile device, the amount of error expected based on clock drift of the mobile device, and the PRS period of the base station. The measurement of block 404 may be within a threshold period of time to decrease the amount of error due to clock drift of the clock of the mobile device used for the asynchronous TOA measurements. At block 404, an indication of the time at which the second PRS from the base station is received may be recorded by the mobile device. The time may be in the form of a clock tick count. Means for performing block 404 include the components of mobile device 300. More specifically, means for performing block 404 include a cellular network interface configured to receive PRS's and a TOA measurement engine, which may be implemented using one or more processors.

At block 405, a second location of the mobile device at the time of the second TOA measurement may be determined. The location determined at block 405 may be performed similarly to the determination of location of the mobile device performed at block 403. The locations determined at blocks 403 and 405 may be compared to determine if the mobile device has moved by at least a threshold distance. If not, no TDOA value may be calculated for the pair of TOA measurements. The location determined at block 405 may be stored in association with the clock tick count of block 450. Means for performing block 405 include the components of mobile device 300. More specifically, means for performing block 405 include a location determination module, such as a satellite-based positioning system (e.g., GPS).

At block 406, the location of the base station may be determined using the TOA values and the associated locations. Various arrangements for calculating a location based on TOA values is known. All of the TOA measurements and location measurements may have been gathered using a single mobile device, which was not synchronized to any clock or signal of the base station or any other base station of the same or different cellular network. The location of the base station determined at block 406 may be stored by the mobile device (if calculated by the mobile device) and/or may be stored by the base station location server (if calculated by a server, such as a base station location server). If calculated by the mobile device, the base station location may be transmitted to the server along with an identifier of the base station (which may be the same identifier transmitted as part of the PRS). Once the location of the base station is known, the base station may be used to triangulate or trilaterate (or otherwise identify) locations of mobile devices that are at unknown locations. Means for performing block 406 include the components of mobile device 300 and/or components of system 100. More specifically, means for performing block 406 include a TOA measurement engine and TOA/location measurement storage medium. Means for performing block 406 may also include a base station location server.

Method 400A focuses on the broadcast of PRS's by the base station of a 4G LTE network. The broadcast of PRS's occur according to a predefined PRS period; therefore the amount of time that elapses between consecutive PRS broadcasts is known. In other embodiments of method 400A, a reference signal other than a PRS may be used, such as in non-LTE cellular networks. Such a reference signal may be required to be broadcast at predefined timing intervals similar to PRS's.

Figure 4B:
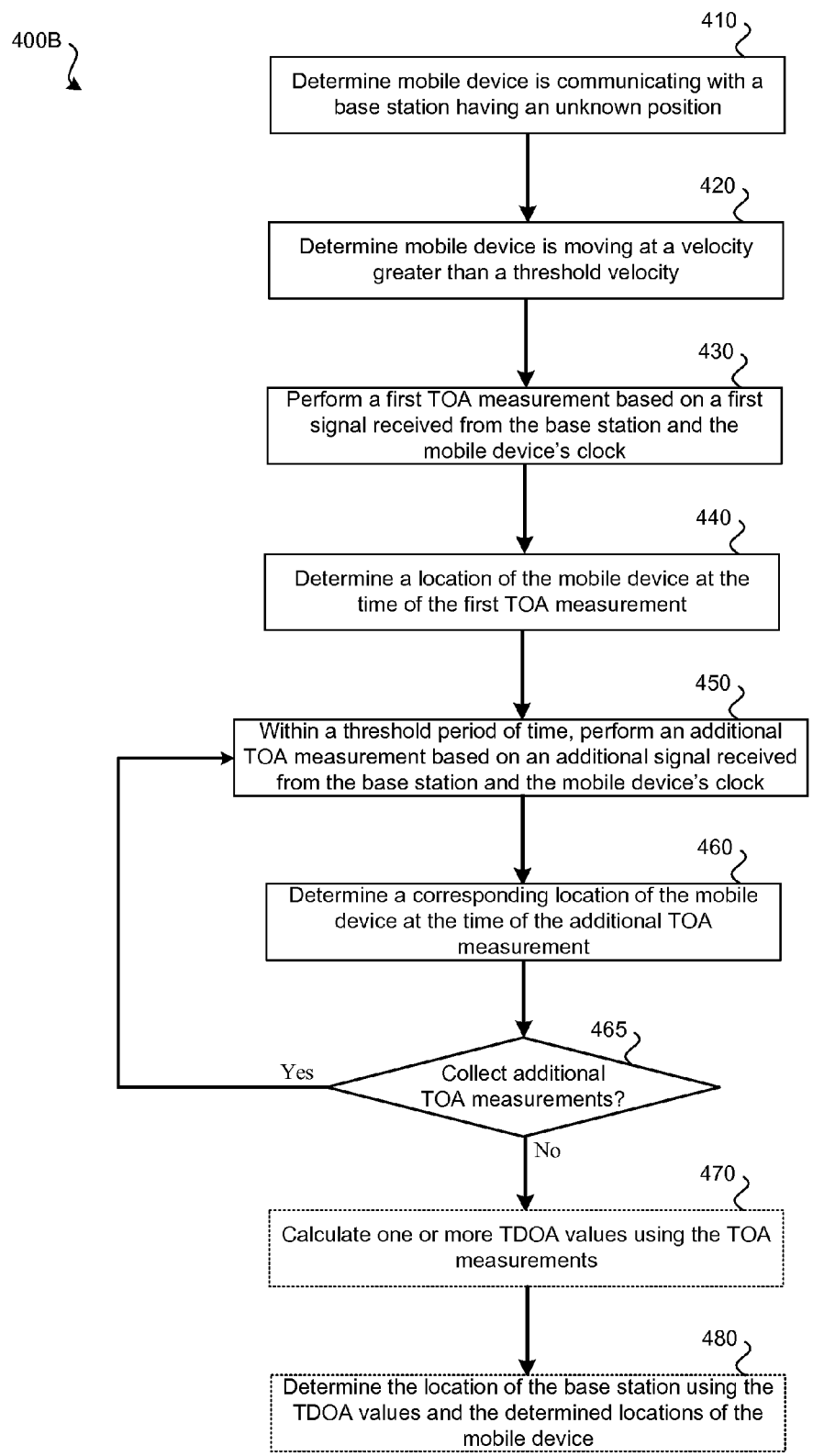
FIG. 4B illustrates another embodiment of a method for using a single mobile device for asynchronous positioning of a base station.

FIG. 4B illustrates an embodiment of a method 400B for using a single mobile device for asynchronous positioning of a base station. Method 400B may correspond to system 100 of FIG. 1. Each block of method 400B may be performed by a mobile device, such as mobile device 110 of FIG. 1. Accordingly, mobile device 300 of FIG. 3 may be used to perform each block of method 400B, unless otherwise noted. Further, the mobile device used to perform method 400B may include one or more instances of computerized components, such as detailed in relation to FIG. 7. Accordingly, means for performing each block of method 400B, unless otherwise noted, may include one or more instances of the components of mobile device 300 of FIG. 3 and/or one or more instances of the components of computer system 700 of FIG. 7. Further, instances of the components of system 100 may be used in performing method 400B.

At block 410, it may be determined whether a mobile device is communicating with the base station that has an unknown position. For example, a location of the base station may only be desired to be determined if an accurate position of the base station has not yet been determined. For example, if an identifier of a base station is not associated with an accurate position in a database of a base station location server, it may be desirable to determine the location of the base station for future use in positioning mobile devices. Block 410 may include a mobile device receiving an indication that TOA measurements for the base station are to be collected (if the mobile device is moving at greater than a threshold velocity) from a base station location server. Means for performing block 410 include the components of mobile device 300 and components of system 100. More specifically, means for performing block 410 include a base station location server, base station, and mobile device, which includes computerized components.

At block 420, it may be determined whether the mobile device is moving at a velocity greater than a threshold velocity. TOA measurements may only be captured by the mobile device if the mobile device has been determined to be moving at greater than a threshold velocity. Such a condition may ensure TOA measurements are taken at a sufficient distance from each other while minimizing the amount of clock drift that may occur between TOA measurements. The mobile device may assess whether it is moving at a sufficient velocity based on measurements obtained from the accelerometer of the mobile device or from positioning measurements collected via a satellite-based positioning system, such as GPS. The velocity (or change in position over time) of the mobile device may be compared to a stored, predefined velocity value defined to be the threshold velocity. In some embodiments, the threshold velocity is 10 MPH, 15 MPH, 20 MPH, 25 MPH, 30 MPH or higher. Other values (e.g., any velocity between any of these values) may also be defined to be the threshold. If the mobile device is moving at a velocity matching and/or greater than the threshold velocity, TOA and location measurements may be eligible to be collected and/or used for determining the location of the base station. Other forms of determining the mobile device is moving at a sufficient velocity may also be possible. In some embodiments, rather than making collection of TOA measurements and/or location measurements contingent on the mobile device moving a sufficient velocity, the measurements may be made, but only used in determining the location of the base station if the mobile device is determined to be moving at a sufficient velocity. As such, velocity may be measured to determine whether TOA measurements and location measurements should be used or ignored. Means for performing block 420 include the components of mobile device 300. More specifically, means for performing block 420 include an accelerometer and a satellite-based positioning system.

At block 430, a first TOA measurement may be collected by the mobile device. The first TOA measurement may indicate when a PRS was received from the base station. The timing of the TOA measurement collected at block 430 may be based on a local clock of the mobile device. This local clock of the mobile device may not be synchronized with any clock external to the mobile device or any signal external to the mobile device. Therefore, the mobile device performing block 430 is not synchronized with the base station which broadcast the PRS or any other base station (of the cellular network of the base station or some other cellular network). Accordingly, the mobile device performing block 430 may be in communication with only the base station having the unknown location. The indication of the time at which the first PRS from the base station having the unknown location is received may be recorded by the mobile device, such as in the form of a clock tick count to a non-transitory computer-readable storage medium of the mobile device. Means for performing block 430 include the components of mobile device 300. More specifically, means for performing block 430 include a cellular network interface configured to receive PRS's and a TOA measurement engine, which may be implemented using one or more processors. Means for recording the TOA measurement may include a non-transitory computer-readable storage medium.

At block 440, a location of the mobile device at the time of the first TOA measurement may be determined Ideally, determination of the location at block 440 may occur at the same time as the first TOA measurement of block 430. However, in some embodiments, it may be acceptable for the location measurement of the mobile device to be collected within a threshold period of time of the TOA measurement at block 430 being measured. For example, the location determined at block 440 may be determined within one second of the TOA measurement of block 430. The location determined at block 440 may be stored in associated with the clock tick count of block 430. Means for performing block 440 include the components of mobile device 300, including a non-transitory computer-readable storage medium. More specifically, means for performing block 440 also include a location determination module, such as a satellite-based positioning system (e.g., GPS).

At block 450, within a threshold period of time, a second TOA measurement may be performed by the mobile device. This second TOA measurement is performed based on another, later PRS broadcast by the same base station. The amount of time that elapses between the TOA measurement at block 430 and the TOA measurement that occurs at block 450 may be based on multiple factors, including one or more of: the velocity of the mobile device, the amount of error expected based on clock drift of the mobile device, and the PRS period of the base station. The measurement of block 450 may be within a threshold period of time to decrease the amount of error due to clock drift of the clock of the mobile device used for the asynchronous TOA measurements. At block 450, an indication of the time at which the second PRS from the base station is received may be recorded by the mobile device. The time may be in the form of a clock tick count. Means for performing block 450 include the components of mobile device 300. More specifically, means for performing block 450 include a cellular network interface configured to receive PRS's and a TOA measurement engine, which may be implemented using one or more processors.

At block 460, a second location of the mobile device at the time of the second TOA measurement may be determined. The location determined at block 460 may be performed similarly to the determination of location of the mobile device performed at block 440. The locations determined at blocks 440 and 460 may be compared to determine if the mobile device has moved by at least a threshold distance. If not, no TDOA value may be calculated for the pair of TOA measurements. The location determined at block 460 may be stored in association with the clock tick count of block 450. Means for performing block 460 include the components of mobile device 300. More specifically, means for performing block 460 include a location determination module, such as a satellite-based positioning system (e.g., GPS).

At block 465, it may be determined whether additional TOA measurements are to be collected based on PRS's of the base station. If so, method 400B may return to block 450 to continue to make TOA measurements based on PRS's transmitted by the base station and collecting locations of the mobile device associated with the measured TOA measurements. Means for performing block 465 include the components of mobile device 300. More specifically, means for performing block 465 include a TOA measurement engine, which may be implemented using one or more processors of the mobile device.

In some embodiments, the TOA measurements and associated locations of the mobile device are transmitted to a base station location server for use in determining the location of the base station. As such, following block 460, the collected TOA measurements and associated locations may be transmitted to a base station location server. Such transmission may be via the base station, via another base station (of the same or different cellular network), or via an alternate network connection. In other embodiments, one or more TDOA values are calculated at the mobile device, and, possibly, the location of the base station is calculated at the mobile device based on the calculated TDOA values. Accordingly, block 470 and/or block 480 may be performed locally by a mobile device or may be performed remotely by a base station location server after the TOA (or TDOA) values and associated locations have been transferred to the base station location server.

At block 470, TDOA values may be calculated for pairs of TOA measurements. Calculation of TDOA values may be in accordance with equations 1-3. In order to locate the base station, it may be necessary to have at least two pairs of TOA measurements. Therefore, at least three TOA measurements (and associated locations of the mobile device) may need to be collected. Using at least three TOA measurements, at least two TDOA values may be calculated. Since the TOA measurements were asynchronous (that is, only based on the mobile device's clock and not synchronized with any external signal or clock), the calculated TDOA values are likewise asynchronous. For each TDOA value calculated at block 470, two locations of the mobile device may be associated (which are the two locations at which the TOA measurements used to calculate the TDOA value were measured). At least two TDOA values and, thus, four associated locations, may be necessary to determine a two-dimensional location of the base station. The third dimension of altitude may be based on a terrain map or database that is stored by or accessible to the base station location server or mobile device. Means for performing block 470 include the components of mobile device 300 and/or components of system 100. More specifically, means for performing block 470 include a TOA measurement engine and TOA/location measurement storage medium. Means for performing block 470 may also include a base station location server.

At block 480, the location of the base station may be determined using the calculated TDOA values and the associated locations. Various arrangements for calculating a location based on TDOA values is known. All of the TOA measurements and location measurements may have been gathered using a single mobile device, which was not synchronized to any clock or signal of the base station or any other base station of the same or different cellular network. The location of the base station determined at block 480 may be stored by the mobile device (if calculated by the mobile device) and/or may be stored by the base station location server (if calculated by the base station location server). If calculated by the mobile device, the base station location may be transmitted to the base station location server along with an identifier of the base station (which may be the same identifier transmitted as part of the PRS). Once the location of the base station is known, the base station may be used to triangulate or trilaterate (or otherwise identify) locations of mobile devices that are at unknown locations. Means for performing block 480 include the components of mobile device 300 and/or components of system 100. More specifically, means for performing block 480 include a TOA measurement engine and TOA/location measurement storage medium. Means for performing block 480 may also include a base station location server.

Method 400B focuses on the broadcast of PRS's by the base station of a 4G LTE network. The broadcast of PRS's occur according to a predefined PRS period; therefore the amount of time that elapses between consecutive PRS broadcasts is known. In other embodiments of method 400B, a reference signal other than a PRS may be used, such as in non-LTE cellular networks. Such a reference signal may be required to be broadcast at predefined timing intervals similar to PRS's.

Figure 5:
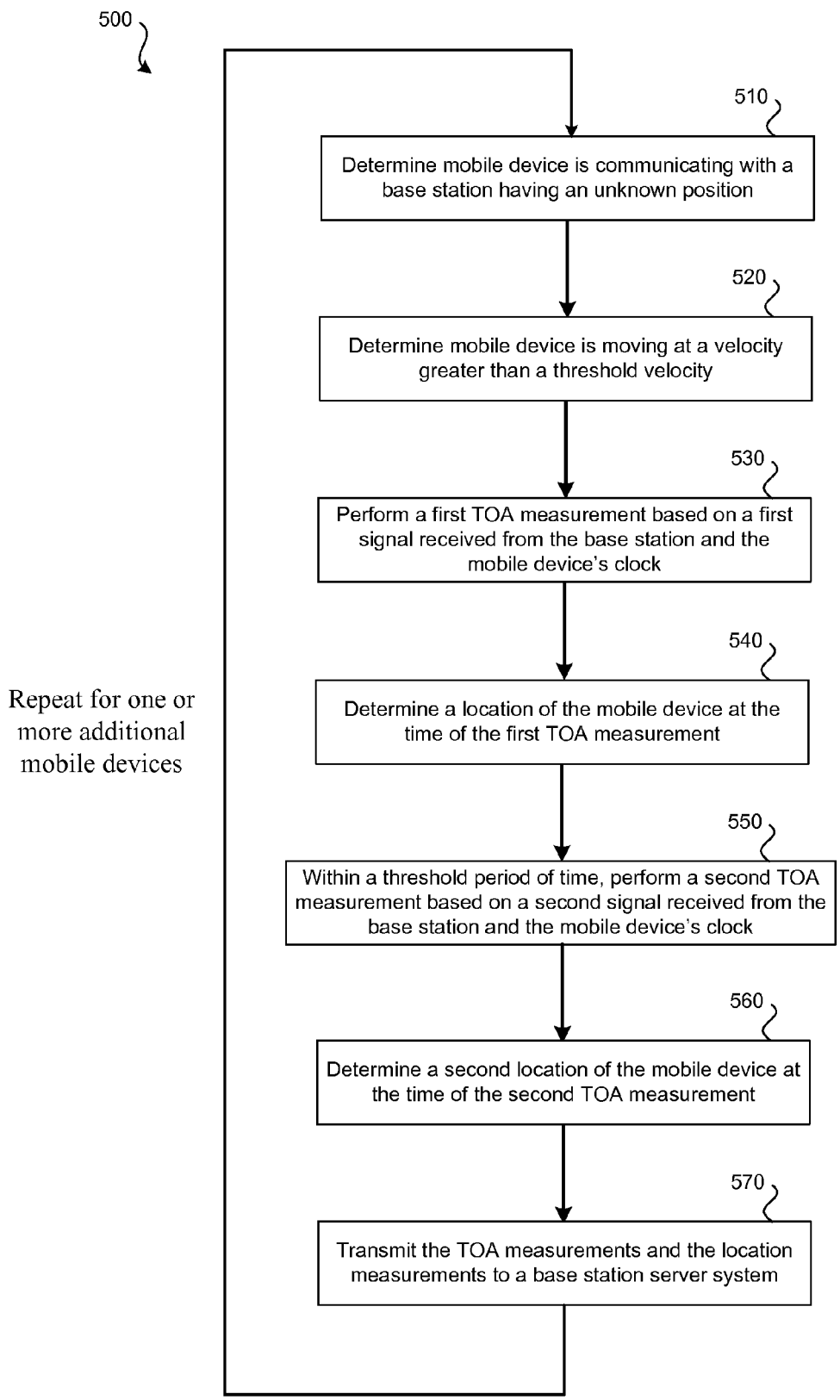
FIG. 5 illustrates an embodiment of a method for using two or more mobile devices for asynchronous positioning of a base station.

FIG. 5 illustrates an embodiment of a method 500 for using two or more mobile devices for asynchronous positioning of a base station. For example, embodiments of method 500 may involve the use of two mobile devices, three mobile devices, four mobile devices, or more. The TOA measurements of each of these mobile devices are not synchronized with each other or with any base station. As such, the clocks of these mobile devices are not synchronized and the TOA measurements are asynchronous. Method 500 may be performed using system 200 of FIG. 2. Each block of method 500 may be performed by mobile devices such as mobile device 210, mobile device 220, and mobile device 230 of FIG. 2. Accordingly, multiple instances of mobile device 300 of FIG. 3 may perform each block of method 500. Further, the mobile devices used to perform method 500 may include one or more instances of computerized components, such as detailed in relation to FIG. 7. Accordingly, means for performing each block of method 500, unless otherwise noted, may include one or more instances of the components of mobile device 300 of FIG. 3 and/or one or more instances of the components of computer system 700 of FIG. 7. Further, instances of the components of system 200 of FIG. 2 may be used in performing method 500. Functions performed by the mobile device of method 400B may also be performed by one or more mobile devices as part of method 500.

At block 510, it may be determined whether a mobile device is communicating with the base station that has an unknown position. For example, a location of the base station may only be desired to be determined if an accurate position of the base station has not yet been determined. For example, if an identifier of a base station is not yet associated with an accurate position in a database of the base station location server, it may be desirable to determine the location of the base station. Block 510 may include a mobile device receiving an indication that TOA measurements for the base station are to be collected (if the mobile device is moving at greater than a threshold velocity). Means for performing block 510 include the components of mobile device 300 and components of system 100. More specifically, means for performing block 510 include a base station location server, base station, and mobile device.

At block 520, it may be determined whether the mobile device is moving at a velocity greater than a threshold velocity. The mobile device may assess whether it is moving at a sufficient velocity based on velocity measurements obtained from an accelerometer of the mobile device or from positioning measurements collected via a satellite-based positioning system, such as GPS. Other forms of determining the mobile device is moving at a sufficient velocity may also be possible. If the mobile device is moving at a velocity matching and/or greater than the threshold velocity, TOA and location measurements may be eligible to be collected and/or used for determining the location of the base station. TOA measurements may only be captured by the mobile device if the mobile device has been determined to be moving at greater than a threshold velocity. In some embodiments, rather than making collection of TOA measurements and/or location measurements contingent on the mobile device moving a sufficient velocity, the measurements may be made, but only used in determining the location of the base station if the mobile device is determined to be moving at a sufficient velocity. As such, velocity may be measured to determine whether TOA measurements and location measurements should be used or ignored. Means for performing block 520 include the components of mobile device 300. More specifically, means for performing block 520 include an accelerometer and a satellite-based positioning system.

At block 530, a first TOA measurement may be performed by the mobile device. The first TOA measurement may indicate when a PRS is received from the base station having an unknown location. The timing of the TOA measurement collected at block 530 may be based only on a local clock of the mobile device (which is not synchronized with any base station, other mobile device, or any received signal). Therefore, the mobile device performing block 530 is not synchronized with the base station which broadcasts the PRS or with any other base station. Accordingly, the mobile device performing block 530 may be in communication with only the base station having the unknown location. The indication of the time at which the first PRS from the base station having the unknown location is received may be recorded by the mobile device, such as in the form of a clock tick count. Means for performing block 530 include the components of mobile device 300. More specifically, means for performing block 530 include a cellular network interface configured to receive PRS's and a TOA measurement engine, which may be implemented using one or more processors.

At block 540, a location of the mobile device at the time of the first TOA measurement may be determined Ideally, the location determined at block 540 may occur at the same time as the first TOA measurement of block 530. However, in some embodiments, it may be acceptable for the location measurement of the mobile device to be determined within a threshold period of time of the TOA measurement at block 530 being measured. For example, the location determined at block 540 may be determined within one second of the TOA measurement of block 530. The location determined at block 540 may be stored in association with the clock tick count of block 530. Means for performing block 540 include the components of mobile device 300. More specifically, means for performing block 540 include a location determination module, such as a satellite-based positioning system (e.g., GPS).

At block 550, within a threshold period of time, a second TOA measurement may be performed by the mobile device. This second TOA measurement is performed based on another, later PRS broadcast by the same base station. The amount of time that elapses between the TOA measurement at block 530 and the TOA measurement that occurs at block 550 may be based on multiple factors, including one or more of: the velocity of the mobile device, the amount of error expected based on clock drift of the mobile device, and the PRS period of the base station. The measurement of block 550 may be within a threshold period of time to decrease the amount of error due to clock drift of the clock of the mobile device used for the asynchronous TOA measurements. At block 550, an indication of the time at which the second PRS from the base station having the unknown location may be recorded by the mobile device, such as a clock tick count, may be recorded. Means for performing block 550 include the components of mobile device 300. More specifically, means for performing block 550 include a cellular network interface configured to receive PRS's and a TOA measurement engine, which may be implemented using one or more processors.

At block 560, a second location of the mobile device at the time of the second TOA measurement may be determined. The location determined at block 560 may be performed similarly to how the location of the mobile device was determined at block 540. The locations of blocks 540 and 560 may be compared to determine if the mobile device has moved by at least a threshold distance. If not, no TDOA value may be calculated based on the pair of TOA measurements. The location determined at block 560 may be stored in association with the clock tick count of block 550. Means for performing block 560 include the components of mobile device 300. More specifically, means for performing block 560 include a location determination module, such as a satellite-based positioning system (e.g., GPS).

At block 570, the TOA measurements and associated determined locations may be transmitted to a remote base station location server. At least two TOA measurements and two associated locations may be provided to the base station location server from a mobile device, possibly along with an absolute time estimation. An indication of an identifier of the base station may also be provided by the mobile device to the base station location server. TDOA values may be calculated for pairs of TOA measurements. Rather than TOA measurements being transmitted to the base station location server, TDOA values, which are calculated based on the difference between TOA measurements, may be transmitted to the base station location server by the mobile device. In both scenarios, the location data is transmitted to the base station location server. The location of the base station may be calculated in accordance with method 600 of FIG. 6. Means for performing block 570 include the components of mobile device 300. More specifically, means for performing block 570 include a TOA measurement engine and/or a base station location server.

The blocks of method 500 may be repeated for at least one additional mobile device that is receiving PRS's from the same base station. The second mobile device (and any additional mobile devices) may be expected to exhibit a different amount of clock drift. The greater the number of TOA measurements and associated location measurements collected and used for determining the location of the base station, the greater the accuracy of the location of the base station can be expected. At least two TDOA values based on TOA measurements collected from different mobile devices as part of method 500 may be used to calculate the location of the base station. The measurements by the different mobile devices may involve none, some, or all of the same PRS's broadcast by the base station. The PRS period of the base station may be known by the mobile devices and/or the base station location server. Once a sufficient or desired number of TOA measurements have been gathered (or TDOA values calculated) in accordance with method 500, method 600 may be performed to determine the location of the base station. Means for performing block 570 include the components of mobile device 300. More specifically, means for performing block 570 can include a cellular network interface, other form of network interface, and a TOA/location measurement storage medium.

Method 500 focuses on the broadcast of PRS's by the base station of a 4G LTE network. The broadcast of PRS's occurs according to a predefined PRS period; therefore the amount of time that elapses between consecutive PRS broadcasts is known. In other embodiments of method 500, a reference signal other than a PRS may be used, such as in non-LTE cellular networks. Such a reference signal may be required to be broadcast at predefined timing intervals.

Figure 6:
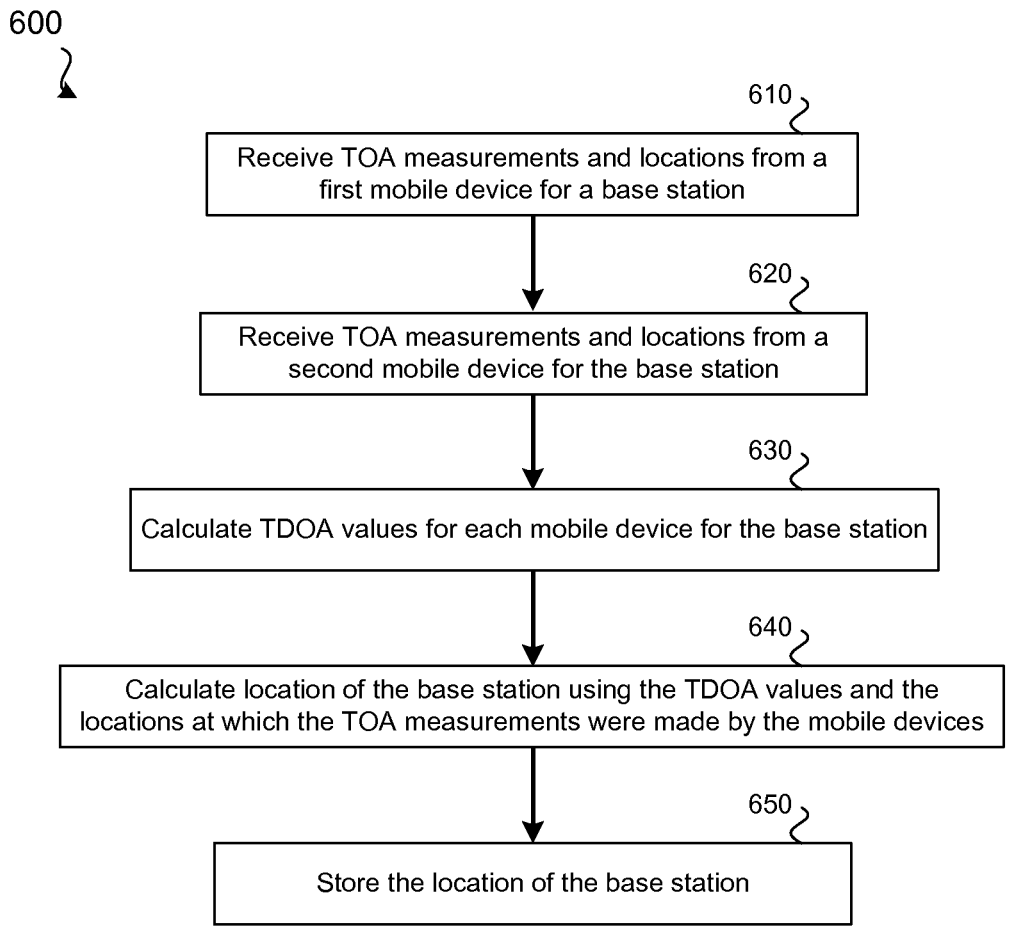
FIG. 6 illustrates an embodiment of a method for calculating a position of a base station using measurements from two or more mobile devices.

FIG. 6 illustrates an embodiment of a method 600 for calculating a location of a base station using TOA measurements from two or more mobile devices. Method 600 may be performed by a base station location server after method 500 of FIG. 5 has been performed by at least two mobile devices. Method 600 may also be used to calculate the location of the base station based on TOA measurements received from a single mobile device, such as in accordance with method 400B of FIG. 4B. For example, two or more mobile devices may have performed method 500. Such measurements are referred to as asynchronous since the TOA measurements of the multiple mobile devices were not synchronized to any clock or signal. Method 600 may correspond to system 200 of FIG. 2. Each block of method 600 may be performed by a base station location server, such as base station location server 130 of FIG. 2. The base station location server, used to perform method 600, may include one or more instances of computerized components, such as detailed in relation to FIG. 7. Accordingly, means for performing each block of method 500, unless otherwise noted, may include one or more instances of the components of computer system 700 of FIG. 7, such as one or more instances of processors and non-transitory computer-readable storage mediums. Further, instances of the components of system 200 of FIG. 2 may be used in performing method 500.

At block 610, TOA measurements and associated locations at which the TOA measurements were captured may be received from a first mobile device. TOA measurements and associated locations may only be received from the first mobile device if it was determined that the mobile device was moving faster than a threshold velocity. These TOA measurements may be associated with a particular base station. At block 620, TOA measurements and associated locations at which these TOA measurements were captured may be received from a second mobile device. TOA measurements and associated locations may only be received from the second mobile device if it was determined that the mobile device was moving faster than a threshold velocity. These measurements may be associated with the same base station as in block 610. At blocks 610 and 620, TOA measurements are received. It should be understood that in other embodiments, TDOA values may be received from the first mobile device and the second mobile device instead. If TDOA values are received, each TDOA value may be associated with two locations (where the TOA measurements were captured that were used to calculate the TDOA value). In the illustrated embodiment of method 600, TOA measurements are received from to mobile devices. It should be understood that, in other embodiments, TOA measurements and/or TDOA values may be received from an additional number of mobile devices and used in calculating the location of a base station. The TOA or TDOA values received at block 610 and at block 620 by the base station location server may be received via the base station having its location determined, via some other base station, or via some alternative network connection. If method 600 is being performed based on TOA information from only a single mobile device, block 620 may not be performed.

At block 630, if TOA measurements were received at blocks 610 and 620, TDOA values may be calculated from these TOA measurements. Calculation of TDOA values may be in accordance with equations 1-3. At least one TDOA value may be calculated for each mobile device. There is no synchronization between the TOA measurements of the first mobile device and the second mobile device. Therefore, there can be expected to be at least some clock drift resulting in an amount of error between the TOA measurements used to calculate a TDOA value for the first mobile device and the TOA measurements used to calculate a TDOA value for the second mobile device.

At block 640, the location of the base station may be calculated using the TDOA values calculated at block 630 (or received from the mobile devices at blocks 610 and 620), along with the location data that indicates where the one or more mobile devices were located when the TOA measurements were made. Also used in determining the location of the base station may be a known PRS period of the base station. For example, for a particular cellular provider, all of the cellular provider's base stations may have the same PRS period. In other embodiments, the PRS period of various base stations of the cellular provider may vary; however by monitoring PRS signals from the base station, it can be determined which PRS period in accordance with the LPP standard is being used by the base station. The PRS period may be used to determine an amount of time that has elapsed between a PRS being broadcast and being received by a mobile device. At block 650, the determined location of the base station may be stored by the base station location server and may be used in the future for determining the position of one or more mobile devices.

Figure 7:
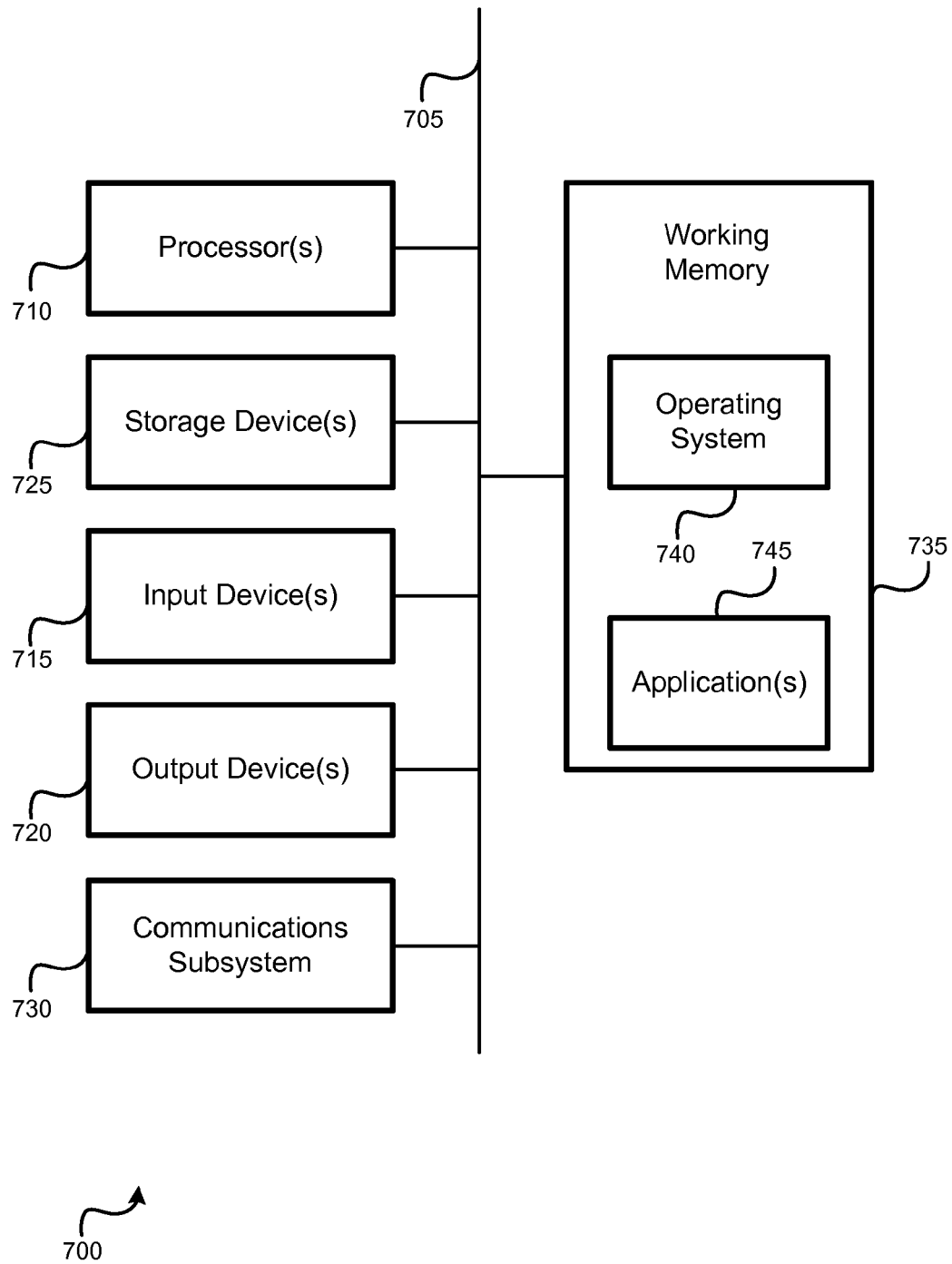
FIG. 7 illustrates an embodiment of a computer system.

FIG. 7 illustrates an embodiment of a computer system. A computer system as illustrated in FIG. 7 may be incorporated as part of the previously described computerized devices, such as the described mobile devices, base stations, base station location servers, and cellular networks. FIG. 7 provides a schematic illustration of one embodiment of a computer system 700 that can perform various blocks of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, video decoders, and/or the like); one or more input devices 715, which can include without limitation a mouse, a keyboard, remote control, and/or the like; and one or more output devices 720, which can include without limitation a display device, a printer, and/or the like. For instance, processors 710 may perform the functions of TOA measurement engine 350 of mobile device 300 of FIG. 3.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like. For instance, non-transitory storage devices 725 may perform the function of TOA/location measurement storage medium 360 of FIG. 3.

The computer system 700 might also include a communications subsystem 730, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed. As such, computer system 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional blocks not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of blocks may be undertaken before, during, or after the above elements are considered.

What is claimed is:

1. A method for determining a location of a base station without timing synchronization, the method comprising:
   determining, by a first mobile device, that the first mobile device is moving faster than a threshold velocity;
   capturing, by the first mobile device, a first unsynchronized time of arrival (TOA) measurement, wherein the first unsynchronized TOA measurement is based on a first unsynchronized timing measurement of a first received reference signal;
   determining, by the first mobile device, a first location of the first mobile device, wherein the first location corresponds to the first unsynchronized TOA measurement;
   capturing, by the first mobile device, a second unsynchronized TOA measurement, wherein the second unsynchronized TOA measurement is based on a second unsynchronized timing measurement of a second received reference signal; and
   determining, by the first mobile device, a second location of the first mobile device, wherein:
      the second location corresponds to the second unsynchronized TOA measurement, and
      based on the mobile device moving faster than the threshold velocity, using the first location of the first mobile device, the second location of the first mobile device, the first unsynchronized TOA measurement, and the second unsynchronized TOA measurement for determining the location of the base station.

2. The method for determining the location of the base station of claim 1, wherein:
   the first received reference signal and the second received reference signal are positioning reference signals (PRS's); and
   the base station is an eNode B.

3. The method for determining the location of the base station of claim 2, wherein the first unsynchronized TOA measurement and the second unsynchronized TOA measurement are captured when the first mobile device is receiving PRS's from only the base station.

4. The method for determining the location of the base station of claim 1, wherein the first unsynchronized TOA measurement and the second unsynchronized TOA measurement are measured based only on an unsynchronized clock of the first mobile device.

5. The method for determining the location of the base station of claim 1, further comprising:
   transmitting, by the first mobile device, data based on the first unsynchronized TOA measurement, the second unsynchronized TOA measurement, the first location, and the second location to a server.

6. The method for determining the location of the base station of claim 1, further comprising:
   receiving, by a server, from the first mobile device, data based on the first unsynchronized TOA measurement, the second unsynchronized TOA measurement, the first location, and the second location; and
   calculating, by the server, a first time difference of arrival (TDOA) value based on the first unsynchronized TOA measurement and the second unsynchronized TOA measurement.

7. The method for determining the location of the base station of claim 6, further comprising:
   receiving, by the server, from a second mobile device, data based on a third unsynchronized TOA measurement, a fourth unsynchronized TOA measurement, a third location, and a fourth location; and
   calculating, by the server, a second TDOA value based on the third unsynchronized TOA measurement and the fourth unsynchronized TOA measurement, wherein timing of the second mobile device is not synchronized with timing of the first mobile device.

8. The method for determining the location of the base station of claim 7, further comprising:
   calculating, by the server, the location of the base station using the first TDOA value, the second TDOA value, the first location, the second location, the third location, the fourth location, and a PRS period of the base station.

9. The method for determining the location of the base station of claim 1, wherein determining that the first mobile device is moving faster than the threshold velocity comprises using a measurement from an accelerometer of the first mobile device.

10. The method for determining the location of the base station of claim 1, wherein determining, by the first mobile device, the first location of the first mobile device comprises using a satellite-based positioning system.

11. A system for determining a location of a base station without timing synchronization, the system comprising:
    a first mobile device, comprising one or more processors and a memory communicatively coupled with and readable by the one or more processors and having stored therein processor-readable instructions which, when executed by the one or more processors, cause the one or more processors to:
       determine that the first mobile device is moving faster than a threshold velocity;
       capture a first unsynchronized time of arrival (TOA) measurement, wherein the first unsynchronized TOA measurement is based on a first unsynchronized timing measurement of a first received reference signal;

determine a first location of the first mobile device, wherein the first location corresponds to the first unsynchronized TOA measurement;

capture a second unsynchronized TOA measurement, wherein the second unsynchronized TOA measurement is based on a second unsynchronized timing measurement of a second received reference signal; and determine a second location of the first mobile device, wherein:
the second location corresponds to the second unsynchronized TOA measurement, and
based on the mobile device moving faster than the threshold velocity, using the first location of the first mobile device, the second location of the first mobile device, the first unsynchronized TOA measurement, and the second unsynchronized TOA measurement for determining the location of the base station.

12. The system for determining the location of the base station of claim 11, wherein:
the first received reference signal and the second received reference signal are positioning reference signals (PRS's); and
the base station is an eNode B.

13. The system for determining the location of the base station of claim 12, wherein the first unsynchronized TOA measurement and the second unsynchronized TOA measurement are captured when the first mobile device is receiving PRS's from only the base station.

14. The system for determining the location of the base station of claim 11, wherein the first unsynchronized TOA measurement and the second unsynchronized TOA measurement are measured based only on an unsynchronized clock of the first mobile device.

15. The system for determining the location of the base station of claim 11, wherein the processor-readable instructions, when executed, further cause the one or more processors to:
cause data based on the first unsynchronized TOA measurement, the second unsynchronized TOA measurement, the first location, and the second location to be transmitted to a server.

16. The system for determining the location of the base station of claim 15, wherein the server is configured to:
receive, from the first mobile device, data based on the first unsynchronized TOA measurement, the second unsynchronized TOA measurement, the first location, and the second location; and
calculate a first time difference of arrival (TDOA) value based on the first unsynchronized TOA measurement and the second unsynchronized TOA measurement.

17. The system for determining the location of the base station of claim 16, the system further comprising a second mobile device, wherein the server is further configured to:
receive from a second mobile device, data based on a third unsynchronized TOA measurement, a fourth unsynchronized TOA measurement, a third location, and a fourth location; and
calculate a second TDOA value based on the third unsynchronized TOA measurement and the fourth unsynchronized TOA measurement, wherein
timing of the second mobile device is not synchronized with timing of the first mobile device.

18. The system for determining the location of the base station of claim 17, wherein the server is further configured to:

calculate the location of the base station using the first TDOA value, the second TDOA value, the first location, the second location, the third location, the fourth location, and a PRS period of the base station.

19. The system for determining the location of the base station of claim 11, wherein the processor-readable instructions that cause the one or more processors of the first mobile device to determine that the first mobile device is moving faster than the threshold velocity comprise processor-readable instructions which, when executed, cause the one or more processors to use a measurement from an accelerometer of the first mobile device.

20. The system for determining the location of the base station of claim 11, wherein the processor-readable instructions that cause the one or more processors to determine the first location of the first mobile device comprise processor-readable instructions which, when executed, cause the one or more processors to determine the first location of the first mobile device using a satellite-based positioning system.

21. A non-transitory processor-readable medium for determining a location of a base station without timing synchronization comprising processor-readable instructions configured to cause one or more processors to:
determine that a first mobile device is moving faster than a threshold velocity;
capture a first unsynchronized time of arrival (TOA) measurement, wherein the first unsynchronized TOA measurement is based on a first unsynchronized timing measurement of a first received reference signal;
determine a first location of the first mobile device, wherein the first location corresponds to the first unsynchronized TOA measurement;
capture a second unsynchronized TOA measurement, wherein the second unsynchronized TOA measurement is based on a second unsynchronized timing measurement of a second received reference signal; and
determine a second location of the first mobile device, wherein:
the second location corresponds to the second unsynchronized TOA measurement, and
based on the first mobile device moving faster than the threshold velocity, using the first location of the first mobile device, the second location of the first mobile device, the first unsynchronized TOA measurement, and the second unsynchronized TOA measurement for determining the location of the base station.

22. The non-transitory processor-readable medium for determining the location of the base station of claim 21, wherein:
the first received reference signal and the second received reference signal are positioning reference signals (PRS's); and
the base station is an eNode B.

23. The non-transitory processor-readable medium for determining the location of the base station of claim 22, wherein the first unsynchronized TOA measurement and the second unsynchronized TOA measurement are captured when the first mobile device is receiving PRS's from only the base station.

24. The non-transitory processor-readable medium for determining the location of the base station of claim 21, wherein the first unsynchronized TOA measurement and the second unsynchronized TOA measurement are measured based only on an unsynchronized clock of the first mobile device.

25. A system for determining a location of a base station without timing synchronization, the system comprising:

means for determining that a first mobile device is moving faster than a threshold velocity;

means for capturing a first unsynchronized time of arrival (TOA) measurement, wherein the first unsynchronized TOA measurement is based on a first unsynchronized timing measurement of a first received reference signal;

means for determining a first location of the first mobile device, wherein the first location corresponds to the first unsynchronized TOA measurement;

means for capturing a second unsynchronized TOA measurement, wherein the second unsynchronized TOA measurement is based on a second unsynchronized timing measurement of a second received reference signal; and means for determining a second location of the first mobile device, wherein:

the second location corresponds to the second unsynchronized TOA measurement, and based on the first mobile device moving faster than the threshold velocity, using the first location of the first mobile device, the second location of the first mobile device, the first unsynchronized TOA measurement, and the second unsynchronized TOA measurement for determining the location of the base station.

26. The system for determining the location of the base station of claim 25, wherein:

the first received reference signal and the second received reference signal are positioning reference signals (PRS's); and the base station is an eNode B.

27. The system for determining the location of the base station of claim 25, wherein the first unsynchronized TOA measurement and the second unsynchronized TOA measurement are measured based only on an unsynchronized clock of the first mobile device.

28. The system for determining the location of the base station of claim 26, wherein the first unsynchronized TOA measurement and the second unsynchronized TOA measurement are captured when the first mobile device is receiving PRS's from only the base station.

29. The system for determining the location of the base station of claim 25, further comprising:

means for transmitting data based on the first unsynchronized TOA measurement, the second unsynchronized TOA measurement, the first location, and the second location to a server.

30. The system for determining the location of the base station of claim 25, further comprising:

means for receiving from the first mobile device, data based on the first unsynchronized TOA measurement, the second unsynchronized TOA measurement, the first location, and the second location; and means for calculating a first time difference of arrival (TDOA) value based on the first unsynchronized TOA measurement and the second unsynchronized TOA measurement.

* * * * *